(12) United States Patent
Miller et al.

(10) Patent No.: US 12,419,446 B2
(45) Date of Patent: Sep. 23, 2025

(54) WALL HANGING KIT

(71) Applicant: Henger Pty Ltd, Cranbourne (AU)

(72) Inventors: Charlie Miller, Cranbourne (AU); Tom Miller, Cranbourne (AU)

(73) Assignee: HENGER PTY LTD, Cranbourne (AU)

( * ) Notice: Subject to any disclaimer, the term of this patent is extended or adjusted under 35 U.S.C. 154(b) by 0 days.

(21) Appl. No.: 17/793,738

(22) PCT Filed: Jan. 25, 2021

(86) PCT No.: PCT/AU2021/000006
§ 371 (c)(1),
(2) Date: Jul. 19, 2022

(87) PCT Pub. No.: WO2021/146767
PCT Pub. Date: Jul. 29, 2021

(65) Prior Publication Data
US 2023/0065186 A1    Mar. 2, 2023

(30) Foreign Application Priority Data
Jan. 23, 2020 (AU) ................................ 2020900172

(51) Int. Cl.
*A47G 1/16* (2006.01)
*A47G 1/20* (2006.01)

(52) U.S. Cl.
CPC ............. *A47G 1/1606* (2013.01); *A47G 1/20* (2013.01); *A47G 1/205* (2013.01)

(58) Field of Classification Search
CPC ......... A47G 1/1606; A47G 1/20; A47G 1/205
USPC ....................................... 248/475.1
See application file for complete search history.

(56) References Cited

U.S. PATENT DOCUMENTS

| 1,616,957 | A | | 2/1927 | Honigbaum | |
|---|---|---|---|---|---|
| 4,775,129 | A | * | 10/1988 | Gleisten | A47G 1/162 248/498 |
| 5,878,988 | A | * | 3/1999 | Rakower | A47G 1/20 248/497 |

* cited by examiner

*Primary Examiner* — Todd M Epps
(74) *Attorney, Agent, or Firm* — Millen, White, Zelano & Branigan, P.C.; Christopher W. Brody

(57) ABSTRACT

A wall hanging kit for attaching a framed object to a wall includes at least one of a screw bracket, a fastener bracket, a first corner bracket and a second corner bracket. The screw bracket includes a first vertical slot on a rear side thereof and a second vertical slot on a front side thereof. The first vertical slot includes open bottom and closed top ends. The second vertical slot includes closed bottom and open top ends. The first vertical slot is adapted to receive a portion of a shaft being adjacent a radially extending feature of the first screw. The second vertical slot is adapted to receive a portion of a shaft being adjacent a radially extending feature of a second screw. The first screw is adapted to be attached to the wall and the second screw is adapted to be attached to the object.

21 Claims, 12 Drawing Sheets

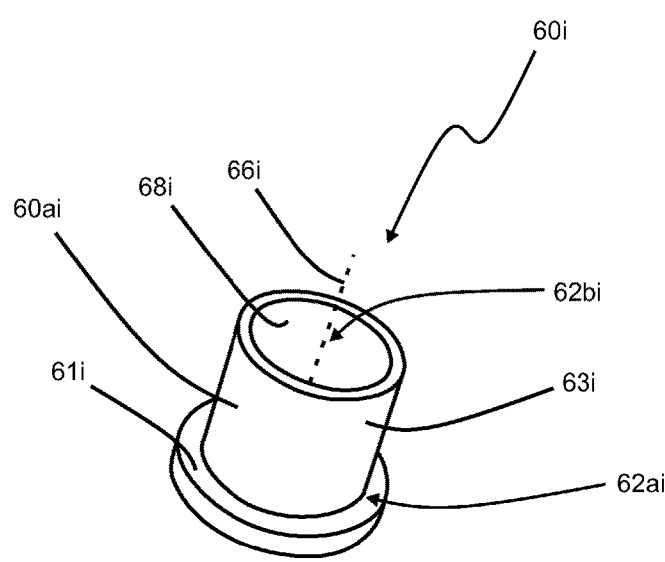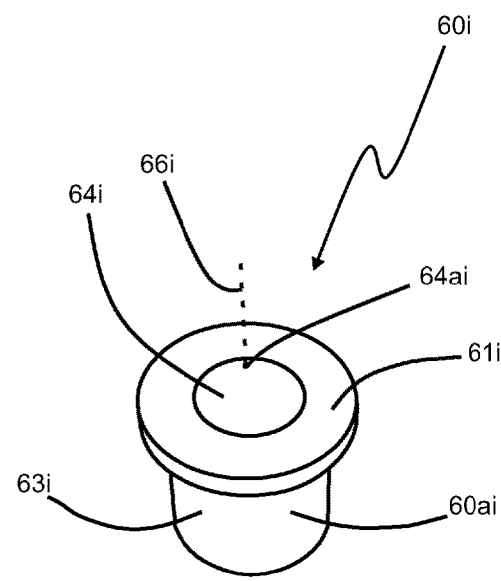
Fig. 5　　　　　　　　Fig. 6
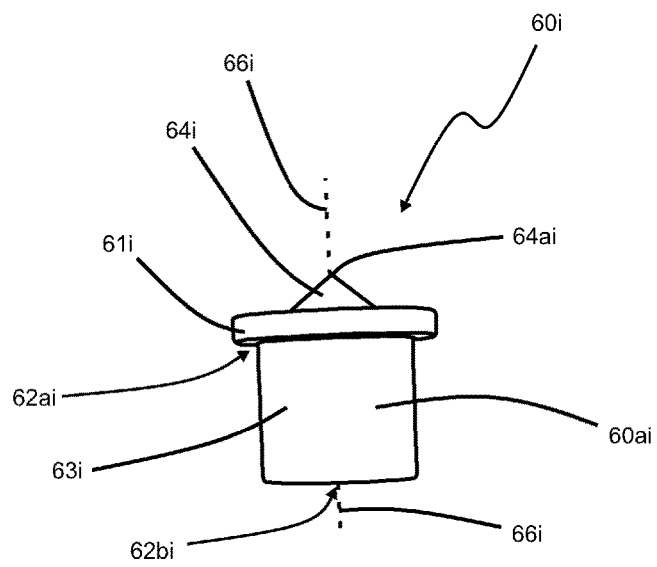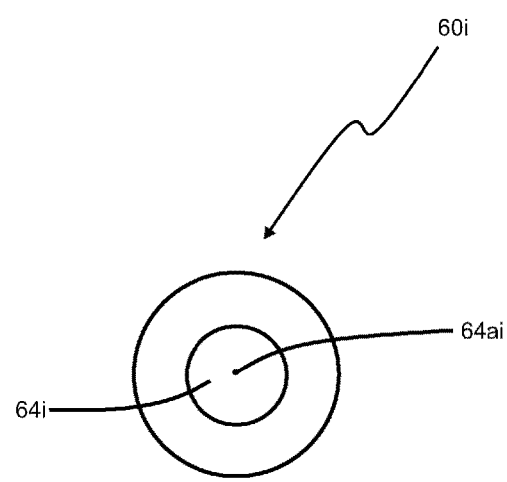
Fig. 7　　　　　　　　Fig. 8

WALL HANGING KIT

FIELD OF INVENTION

This invention relates to a wall hanging kit. More particularly, this invention relates to a wall hanging kit adapted to hang items including picture frames on a wall.

BACKGROUND ART

The following references to and descriptions of prior proposals or products are not intended to be, and are not to be construed as, statements or admissions of common general knowledge in the art. In particular, the following prior art discussion should not be assumed to relate to what is commonly or well known by the person skilled in the art, but to assist in the inventive process undertaken by the inventor(s) and in the understanding of the invention.

Wall hanging devices have been described in which a wire is wound around two screws attached to a frame and the wire is placed over a single hook or screw attached to a wall. It can often be difficult to position the frame in a level orientation and the frames can be moved to an orientation which is not level with an accidental push or with wind.

An object of the present invention is to ameliorate one or more of the aforementioned disadvantages of the prior art or to at least provide a useful alternative thereto.

STATEMENT OF INVENTION

The invention according to one or more aspects may be as defined in the independent claims. Some optional and/or preferred features of the invention are defined in the dependent claims. Accordingly, in one aspect of the invention there is provided:

A display support kit adapted to support a display object on a structure, the display support kit including:
  a bracket formed from a single plate of metal that is folded intermediate its length to provide a first panel and an opposed panel joined at a bend extending laterally across the single plate and having a radius whereby the first and second panels are spaced to receive a head of a first fastener therebetween, the first and second panels extending substantially parallel and in the same direction, the first fastener attachable to the display object, wherein:
  the first panel is bifurcated, having a pair of divergent arms that define a slot having an opening to receive a shaft of the first fastener, the opening wider than a diameter of the shaft whereby the bracket is adapted to trap the head between the panels; and either:
    the bracket includes a T-shaped slot extending through the second panel whereby a cross-arm of the T-shaped slot extends laterally and through the bend and a main bar of the slot is closed at its remote end; and/or
    the second panel terminates in a rolled or bent fold to present a pair of spaced plates in which a pair of associated apertures are aligned and adapted to receive, at an angle transverse to a main plane of the second panel, a shaft of a second fastener adapted to partially embed in the structure.

The bracket may be attached by suitable fasteners, such as screws or press studs. The bracket may be a screw or press stud bracket for connecting the object to the building structure. The bracket may include a first vertical slot on a rear side of the bracket and a second vertical slot on a front side of the bracket, the first vertical slot including an open bottom end and a closed top end, the second vertical slot including a closed bottom end and an open top end, the first vertical slot adapted to receive a portion of a shaft of a first fastener, the portion being adjacent a radially extending feature of the first fastener, the second vertical slot adapted to receive a portion of a shaft of a second fastener, the portion being adjacent a radially extending feature of the second fastener, the first fastener adapted to be attached to the wall and the second fastener adapted to be attached to the object.

The bracket may be in the form of a fastener bracket including:
  a fastener bracket vertical slot on a front side of the fastener bracket, the fastener bracket vertical slot including an open top end and a closed bottom end; and/or
  a first set of at least two registered holes adapted to receive a first fastener, wherein the first fastener is adapted to extend out a rear side of the fastener bracket; and/or
  a second set of at least two registered holes adapted to receive a second fastener.

The second fastener is preferably adapted to extend out of the rear side of the fastener bracket.

The fastener bracket may be adapted to be mounted to the structure in the form of a wall. The first and second fasteners may be positioned such that the rear side of the fastener bracket is in contact with the wall. The fastener bracket vertical slot may be adapted to receive a portion of a shaft of a third fastener. The portion of the third fastener may be adjacent a radially extending feature of the third fastener. The third fastener may be adapted to be attached to the object.

The display support kit may further include a first corner bracket including a first flat plate, the first flat plate mountable to the object. The first corner bracket may further include a fourth fastener which is mountable to the first flat plate, a portion of a shaft of the fourth fastener being adjacent a radially extending feature of the fourth fastener. The fourth fastener may be adapted to be received by either the second vertical slot or the fastener bracket vertical slot.

The display support kit may further include a second corner bracket including a second flat plate which is mountable to the object. The second flat plate may include a second corner bracket hole or slot which is adapted to receive a portion of a shaft of a fifth fastener, the portion of the fifth fastener being adjacent a radially extending feature of the fifth fastener, and the fifth fastener being adapted to be attached to the wall.

In a further aspect of the same invention, there is provided:

A wall hanging kit adapted to attach an object including a frame, to a wall, the wall hanging kit including one or more of the following:
  a first fastener bracket including a first vertical slot on a rear side of the first fastener bracket and a second vertical slot on a front side of the first fastener bracket, the first vertical slot including an open bottom end and a closed top end, the second vertical slot including a closed bottom end and an open top end, the first vertical slot adapted to receive a portion of a shaft of a first fastener, the portion of the first fastener being adjacent a radially extending feature of the first fastener, the second vertical slot adapted to receive a portion of a shaft of a second fastener, the portion of the second fastener being adjacent a radially extending feature of the second fastener, the first fastener adapted to be attached to the wall and the second fastener adapted to be attached to the object;
a second fastener bracket including:
a second fastener bracket vertical slot on a front side of the second fastener bracket, the second fastener bracket vertical slot including an open top end and a closed bottom end;
a first set of at least two registered holes adapted to receive a first fastener, wherein the first fastener is adapted to extend out a rear side of the second fastener bracket;
a second set of at least two registered holes adapted to receive a second fastener, wherein the second fastener is adapted to extend out the rear side of the second fastener bracket,
the second fastener bracket adapted to be mounted to the wall with the first and second fasteners such that the rear side of the second fastener bracket is in contact with the wall, and the second fastener bracket vertical slot is adapted to receive a portion of a shaft of a third fastener, the portion of the third fastener being adjacent a radially extending feature of the third fastener, the third fastener being adapted to be attached to the object;
a first corner bracket including a first flat plate, the first flat plate mountable to the object, the first corner bracket further including a fourth fastener which is mountable to the first flat plate, a portion of a shaft of the fourth fastener being adjacent a radially extending feature of the fourth fastener which is adapted to be received by either the second vertical slot or the fastener bracket vertical slot; and
a second corner bracket including a second flat plate which is mountable to the object, the second flat plate including a second corner bracket hole or slot which is adapted to receive a portion of a shaft of a fifth fastener, the portion being adjacent a radially extending feature of the fifth fastener, the fifth fastener adapted to be attached to the wall.

Any one of the first through to fifth fasteners may be in the form of screws or press studs.

Wall Hanging Kit

At least one component of the wall hanging kit may be sold separately and instructions may be provided to assemble the wall hanging kit. The wall hanging kit may be a kit adapted to be installed by a user. Components of the wall hanging kit may be preinstalled onto a frame.

The wall hanging kit may include one, all or any combination of the fastener bracket, fastener nail bracket, fastener bracket, first corner bracket and second corner bracket. Preferably, the wall hanging kit includes multiples of the first fastener bracket, fastener nail bracket, second fastener bracket, first corner bracket and/or second corner bracket.

The wall hanging kit may be adapted to be obscured by the frame after attaching the frame to the wall with the wall hanging kit. The wall hanging kit may be adapted to be attached to the frame within a horizontal footprint of the frame. The wall hanging kit may be adapted to be attached to the frame within a footprint of the frame which is parallel to a rear face or faces of the frame. The rear faces are adapted to be obscured by the frame when the frame is attached to the wall. The rear faces are adapted to face the wall when the frame is attached to the wall.

Object and Frame

The object may be under 40 kg's (kilograms) in weight. The object may include a picture, a storage container, a basket, a shelf, a sign and other objects under 40 kg's in weight. The object may be under 30 kg's in weight. The object may be under 25 kg's in weight. The frame may include a picture frame. The frame may be a picture frame.

The frame may be made of materials including wood, metal, plastic and/or a composite such as fibreglass.

Wall

The wall may include studs, namely generally vertically aligned, sturdy structural building elements. The studs may be made of materials including wood, metal, and/or plastic. The wall may include wood such as chipboard, solid wood and/or medium density fibreboard (MDF). The wall may be made of materials including paint, plaster, plasterboard (drywall), brick, mortar, concrete, tiles and other ceramics. The wall hanging kit may be adapted to be mounted to plasterboard. The wall hanging kit may be adapted to be mounted to plasterboard without being attached to another other structural member of the wall such as a stud. The wall hanging kit may be adapted to be mounted to the studs.

Bracket or First Fastener Bracket

Any one of the first through to fifth fasteners may be a screw in stud for the corner bracket or may be a pressed in stud.

The bracket or the first fastener bracket may be a screw bracket. The wall hanging kit may include one or multiple screw brackets. Preferably, the wall hanging kit includes multiple screw brackets. Most preferably, the wall hanging kit includes two screw brackets. The two screw brackets may be adapted to be attached to a top of the frame. The two screw brackets may be adapted to be attached to two opposite sides of the frame respectively. Preferably, the two screw brackets are adapted to be attached to two upper corners of the frame respectively.

The bracket or the first fastener bracket may be made of materials including metal, plastic, wood, ceramic and/or a composite such as fibreglass. The bracket or the first fastener bracket may be made of moulded plastic. Preferably, the bracket or the first fastener bracket is made of metal. Most preferably, the bracket or the first fastener bracket is made of copper or brass. The bracket or the first fastener bracket may be in the form of a bent plate.

The bracket or the first fastener bracket may be substantially in the shape of the letter "U". The bracket or the first fastener bracket may be in the form of a plate with a bend between 160°-200°. The bracket or the first fastener bracket may be in the form of a plate with multiple bends compounding to form a bend between 160°-200°. Preferably, the bend is a 180° bend. A bottom of the bracket or the first fastener bracket may include the bend. A top of the bracket or the first fastener bracket may include free cantilevered ends of the first and second flat plates. In this specification, a plate may include multiple plates welded together and/or a single piece of plate. In this specification, a bend in a plate may include a plate which is bent in a manufacturing process and/or a plate moulded or cast to include the bend. The bend may span between the front and rear sides of the bracket or the first fastener bracket. The front and rear sides of the bracket or the first fastener bracket may include curved surfaces. Preferably, the front and rear side of the bracket or the first fastener bracket are substantially flat. "Substantially flat" means that the front and rear sides may include spikes, bumps and/or other surface protrusions adapted to contact the wall and/or the frame to resist rotation of the bracket or the first fastener bracket relative to the wall and/or frame respectively. Preferably, the bracket or the first fastener bracket includes outer spikes on the rear side of the bracket or the first fastener bracket adapted to be pressed into the wall and resist rotation of the bracket or the first fastener bracket relative to the wall. The front side may include a front flat plate spaced away from a rear flat plate on the rear side. The bracket or the first fastener bracket may be adapted such that the rear side of the bracket or the first fastener bracket contacts the wall. The bend may connect and span between the front flat plate and rear flat plate. The bend may be the only structural portion of the bracket or the first fastener bracket which connects the front flat plate and the rear flat plate.

The bracket or the first fastener bracket may be adapted to be attached to the wall and the frame in an orientation in which the first and second vertical slots include longitudinal axis which are orientated vertically. The longitudinal axes of the first and second vertical slots may be parallel to each other.

The first vertical slot may include a first vertical slot profile which is perpendicular to the longitudinal axis of the first vertical slot. The second vertical slot may include a second vertical slot profile which is perpendicular to the longitudinal axis of the second vertical slot. The first and/or second vertical slot profiles may be in the shape of a "T". The first and/or second vertical slots may be adapted to receive the radially extending feature of the second fastener as well as the portion of the shaft of the second fastener. The portion of the shaft of the second fastener may include radially extending features. The portion of the shaft of the second fastener may include or entirely be a cylindrical portion. The second vertical slot profile may conform to a second fastener profile of the radially extending feature and portion of the shaft of the second fastener. The second fastener profile may be a profile in a plane through a longitudinal axis of the second fastener. The first vertical slot profile may conform to a first fastener profile of the radially extending feature of and portion of the shaft of the first fastener. The first fastener profile may be a profile in a plane through a longitudinal axis of the first fastener. The first and/or second vertical slot profile may be "T" shaped through the bend and rectangular through the rear flat plate and front flat plate respectively. Preferably, the first vertical slot profile is "T" shaped through the bend and rectangular through the rear flat plate. Preferably, the second vertical slot profile is rectangular.

The first and second vertical slots may be positioned such that a user can see through the closed bottom end of the second vertical slot and the first vertical slot. The first and second vertical slots may be positioned such that the closed top end of the first vertical slot and closed bottom end of the second vertical slot are coaxial and/or are registered holes. The first and second vertical slots may be positioned such that the user can view a mark in the wall through the first and second vertical slots with a line of sight perpendicular to the front flat plate.

The first and/or second fastener may include a radial flange and/or a step. The radial flange may be separate to and spaced from a head of the first and/or second fastener along the shaft of the first and/or second fastener. The shaft may extend further past the radial flange of the first and/or second fastener. The radial flange and/or step may be adapted to limit a distance that the first and/or second fastener can be attached, such as by being screwed in the case of a screw, into the frame and wall respectively. The radial flange and/or step may act as a barrier such that the first and/or second fastener cannot be attached into the frame and wall respectively further than the radial flange.

The radially extending feature of the first and/or second fastener may include the radial flange of the first and/or second fastener. Preferably, a head on a first end of the first and/or second fastener includes the radially extending feature of the first and/or second fastener, respectively. The first and/or second fastener may be a screw and may include a thread which may be tapered from the radial flange, radially extending feature, shaft and/or step down to a tip on a second end of the first and/or second fastener, respectively. The tip in this context means where the first and/or second fastener is first inserted into the frame and wall respectively. The head of the first and/or second fastener may include a tool feature such as a linear channel adapted to receive a tool for screwing the first and/or second fastener, respectively, such as a screwdriver. When the portion of the shaft of the first fastener is inserted into the first vertical slot, the first vertical slot may restrict lateral movement and/or be a close fit of the first fastener in the first vertical slot. "Laterally" and "lateral movement" in this context mean in a direction perpendicular to the longitudinal axis of the first vertical slot. A close fit in this context means a gap of less than 20% of a diameter or largest width of the portion of the shaft of the first fastener. When the portion of the shaft of the first fastener is inserted into the first vertical slot, the bracket or the first fastener bracket may be adapted such that the longitudinal axis of the first fastener is orientated perpendicular to the longitudinal axis of the first vertical slot.

Likewise, the above description of insertion for the first fastener applies to the second fastener. When the portion of the shaft of the second fastener is inserted into the second vertical slot, the bracket or the first fastener bracket may be adapted to restrict lateral movement and/or be a laterally close fit of the second fastener in the second vertical slot. "Laterally" and "lateral movement" in this context means in a direction perpendicular to the longitudinal axis of the second vertical slot. A close fit in this context means a gap of less than 20% of a diameter or largest width of the portion of the shaft of the second fastener. When the portion of the shaft of the second fastener is inserted into the second vertical slot, the second vertical slot may be adapted such that the longitudinal axis of the second fastener is orientated perpendicular to the longitudinal axis of the second vertical slot.

The first and/or second vertical slot may include one open longitudinally aligned side. Preferably, the first and/or second vertical slot include two open longitudinally aligned sides and two closed longitudinally aligned sides. The first vertical slot may be a slot through solely the rear flat plate or the rear flat plate and the bend. The second vertical slot may be a slot through solely the front flat plate or the front flat plate and the bend. The first vertical slot may be in the form of a cut out extending through an entire thickness of the rear flat plate. The second vertical slot may be in the form of a cut out extending through an entire thickness of the front flat plate.

Longitudinal faces on the longitudinal closed sides of the second vertical slot may be orientated at an angle between 0" and 170° or between 0° and 90° from each other. The longitudinal faces on the longitudinal closed sides of the second vertical slot may form a "V". The longitudinal faces of the first vertical slot may be curved. The longitudinal faces may be orientated between 15°-30° from each other. Preferably, the longitudinal faces of the second vertical slot are linear and parallel to each other. Longitudinal faces on the longitudinal closed sides of the first vertical slot may be orientated at an angle between 0° and 170° or between 0° and 90° from each other. The longitudinal faces may form a "V". The longitudinal sides of the second vertical slot may be curved. The longitudinal sides may be parallel to each other. Preferably, the longitudinal sides of the second vertical slot are linear and are orientated between 15°-30° from each other.

The open bottom end of the first vertical slot may be open in that the portion of the shaft of the first fastener can be directly inserted and taken out of the open bottom end to and from inside the first vertical slot. The closed top end of the first vertical slot may be closed in that the portion of the shaft of the first fastener cannot be directly inserted into or taken out of the closed top end. The closed bottom end of the second vertical slot may be closed in that the portion of the shaft of the second fastener cannot be directly inserted into or taken out of the closed bottom end to or from inside the second vertical slot respectively. The open top end of the second vertical slot may be open in that the portion of the shaft of the second fastener can be directly inserted into or taken out of the open top end to or from inside the second vertical slot respectively.

A maximum width or diameter of the radially extending features of the first and second fasteners may be larger than a minimum width of the first and second vertical slots respectively. Therefore, the radially extending features of the first and/or second fastener may not be able to be inserted into or taken out of the first vertical slot and/or second vertical slot respectively in a direction perpendicular to the longitudinal axes of the first and/or second vertical slots respectively.

The second fastener may be attached, such as by being screwed, directly into the frame or screwed into a pilot hole in the frame. The first fastener may be screwed directly into the wall or screwed into a pilot hole in the wall.

Second Fastener Bracket

The wall hanging kit may include one or multiple fastener brackets. Preferably, the wall hanging kit includes multiple fastener brackets. Most preferably, the wall hanging kit includes two fastener brackets, including the bracket or the first fastener bracket on the one hand, and the second fastener bracket on the other. The fastener brackets may be adapted to be attached to a top of the frame. The fastener brackets may be adapted to be attached to two vertical and opposite sides of the frame respectively. Preferably, the two fastener brackets are adapted to be attached to two upper corners of the frame respectively.

The second fastener bracket may be made of materials including metal, plastic, wood, ceramic and/or a composite such as fibreglass. The second fastener bracket may be made of moulded plastic. Preferably, the second fastener bracket is made of metal. Most preferably, the second fastener bracket is made of copper or brass. The second fastener bracket may be in the form of a bent plate.

The second fastener bracket may be made of a single piece of bent plate. The second fastener bracket may include a front vertical plate. The front vertical plate may be located on the front side of the second fastener bracket. A rear side of the second fastener bracket may be adapted to contact the wall and/or the front of the second fastener bracket may be adapted to contact the frame. The front vertical plate may be a flat plate. The front vertical plate may include the second fastener bracket vertical slot. The second fastener bracket vertical slot may be a cut out which extends completely through a whole thickness of the front vertical plate.

The second fastener bracket may be adapted to be attached to the wall and the frame in an orientation in which the fastener bracket vertical slot includes a longitudinal axis which is orientated vertically.

The second fastener bracket vertical slot may include a fastener bracket vertical slot profile which is perpendicular to the longitudinal axis of the fastener bracket vertical slot. The second fastener bracket vertical slot profile may be in the shape of a "T". The second fastener bracket vertical slot profile may be sized and shaped to receive a third fastener profile of the portion of the shaft and radially extending feature of the third fastener. The third fastener profile may be a profile in a plane through a longitudinal axis of the third second. The second fastener bracket vertical slot profile may include a cross section in the shape of the third fastener profile. The second fastener bracket vertical slot profile may be "T" shaped through the bend and rectangular through the front vertical plate. Preferably, the second fastener bracket vertical slot profile is rectangular.

When the portion of the shaft of the third fastener is inserted into the second fastener bracket vertical slot, the second fastener bracket vertical slot may be adapted to restrict lateral movement and/or be a laterally close fit of the third fastener in the fastener bracket vertical slot. "Laterally" and "lateral movement" in this context mean in a direction perpendicular to the longitudinal axis of the second fastener bracket vertical slot. When the portion of the shaft of the third fastener is inserted into the second fastener bracket vertical slot, the second fastener bracket may be adapted such that the longitudinal axis of the third fastener is orientated perpendicular to the longitudinal axis of the fastener bracket vertical slot.

The fastener bracket vertical slot may include one open longitudinally aligned side. Preferably, the fastener bracket vertical slot includes two open longitudinally aligned sides and two closed longitudinally aligned sides. The fastener bracket vertical slot may be a slot through solely the front vertical plate or the front vertical plate and the bend. In this specification, a closed side or end of a slot may include a wall or internal surface of the slot and an open side of the slot may include a hole or opening.

The closed longitudinal sides of the fastener bracket vertical slot may include longitudinal faces which may be orientated at an angle between 1° and 170° or between 1° and 90° from each other in the shape of a "V". The longitudinal faces of the fastener bracket vertical slot may be curved. The longitudinal faces of the fastener bracket vertical slot may be parallel to each other. Preferably, the longitudinal faces of the fastener bracket vertical slot are linear and orientated between 15°-30° from each other.

The open top end of the fastener bracket vertical slot may be open in that the portion of the shaft of the third fastener can be directly inserted into and taken out of the open top end to or from inside the fastener bracket vertical slot. The closed bottom end of the fastener bracket vertical slot may be closed in that the portion of the shaft of the third fastener cannot be directly inserted into or taken out of the closed bottom end to or from inside the fastener bracket vertical slot.

The third fastener may be identical to the first and/or second fastener. The third fastener may include a radial flange and/or a step. The radial flange may be separate to and spaced from a head of the third fastener along the shaft of the third fastener. The radial flange and/or step may be adapted to limit a distance that the third fastener can be inserted, such as by being screwed, into the frame and wall, respectively. The radial flange and/or step may act as a barrier such that the third fastener cannot be inserted, such as by being screwed, into the frame further than the radial flange.

The radially extending feature of the third fastener may include the radial flange of the third fastener. Preferably, a head on a first end of the third fastener includes the radially extending feature of the third fastener A thread on a second end of the third fastener may be tapered from the radial flange, radially extending feature, shaft and/or step down to a tip of the third fastener, respectively. The tip in this context means where the third fastener is first inserted into the frame and is on an opposite end of the third fastener to the head of the third fastener.

The third fastener may be inserted, such as by being screwed, directly into the frame or inserted into a pilot hole in the frame.

The second fastener bracket may include a rear vertical plate. The rear vertical plate may be a flat plate. The rear vertical plate may be formed of the same plate as the front vertical plate. The second fastener bracket may include a bend spanning between and connecting the rear vertical plate to the front vertical plate. The rear vertical plate may be located on the rear side of the second fastener bracket. The rear vertical plate may be parallel to the front vertical plate. The rear vertical plate may include a sight hole adapted to allow the user to view a mark in the wall through the sight hole to line up and attach the second fastener bracket to the wall over the mark. When the second fastener bracket is attached to the wall, the sight hole may be vertically level with any portion of the second fastener bracket vertical slot. When the second fastener bracket is attached to the wall, the sight hole may be vertically level with the closed end of the second fastener bracket vertical slot. The sight hole may be coaxial with the closed end of the second fastener bracket vertical slot.

The first set of at least two registered holes may extend through the rear vertical plate and the front vertical plate. Preferably, the at least two registered holes only include two registered holes. A first of the at least two registered holes of the first set may extend through the rear vertical plate and a second of the at least two registered holes of the first set may extend through the front vertical plate. The first set of at least two registered holes may extend through the bend between the rear vertical plate and the front vertical plate. Preferably, the at least two registered holes are all coaxial with each other. Preferably, the first fastener is straight and linear and can extend through all of the at least two registered holes of the first set.

A top of the second fastener bracket may be in the form of a triangular prism. The triangular prism may be formed from bends in the bent plate of the second fastener bracket. The rear vertical plate may form a first side of the triangular prism. A second side of the triangular prism may extend from the rear vertical plate at an angle of between 10°-90°. A third side of the triangular prism may extend from the second side at an angle of between 10°-170°.

The second set of at least two registered holes may extend through the second side of the triangular prism and the first side of the triangular prism. Preferably, the at least two registered holes of the second set only include two registered holes. A first of the at least two registered holes of the second set may extend through the second side of the triangular prism and a second of the at least two registered holes of the second set may extend through the first side of the triangular prism. Preferably, the at least two registered holes of the second set are all coaxial with each other. Preferably, the second fastener is straight and linear and can extend through all the at least two registered holes of the first set.

The following descriptions of a first line which is through the first set of at least two registered holes may also apply to a longitudinal axis of the first fastener and features described in each case are interchangeable with the other case. The following descriptions of a second line which is through the second set of at least two registered holes may also apply to a longitudinal axis of the second fastener and features described in each case are interchangeable with the other case. The rear vertical plate may include a rear surface which is adapted to contact the wall. The first line may be orientated between 0°-20° from perpendicular to the rear vertical plate and/or rear surface. The first line may be orientated between 0°-10° from perpendicular to the rear vertical plate and/or rear surface. The first line may be orientated in a first plane which is vertical and perpendicular to the rear vertical plate and/or rear surface. Preferably, the first line is orientated perpendicular to the rear vertical plate and/or rear surface. The second line may be orientated within 10° of perpendicular to the rear vertical plate and/or rear surface. The second line may be orientated at an angle between 10°-80° from the rear vertical plate and/or rear surface. Preferably, the second line is orientated at an acute angle between 30°-80° from the rear vertical plate and/or rear surface. Most preferably, the second line is orientated at an acute angle between 50°-70° from the rear vertical plate and/or rear surface. The second line may be orientated in the first plane. Preferably, the second line is orientated downwards from the front side of the second fastener bracket to the rear side of the second fastener bracket.

The first and/or second fasteners may be screws. Alternatively, the first and second fasteners are nails. Preferably, where the first and second fasteners are nails, they are elongate nails. The second fastener bracket may be adapted such that the first fastener is first inserted through the first set of at least two registered holes and then the second fastener is inserted through the second set of at least two registered holes.

First Corner Bracket

The wall hanging kit may include a single first corner bracket. The wall hanging kit may include at least two first corner brackets. Preferably, the wall hanging kit includes two first corner brackets. The two corner brackets may be adapted to be attached to the two upper corners of the frame, respectively. A first of the two first corner brackets may be adapted to be attached to a first of the two upper corners and a second of the two first corner brackets may be adapted to be attached to a second of the two upper corners. The upper corners in this context means on an upper end or the top of the frame with the frame in an orientation in which it is attached to the wall. The two first corner brackets may be sized and shaped such that they do not overlap each other when attached to the two upper corners of the frame.

In this specification, the terms "the first and second flat plates" are used interchangeably with "the first and second panels", respectively. The first flat plate may extend in two directions at between 70°-110°, preferably 90° from each other. The frame may include two edges connecting at one of the two upper corners of the frame when attached to the frame. The first flat plate may include two first flat plate edges extending from a first flat plate corner of the first flat plate, the two first flat plate edges extending along the two edges of the corner of the frame which the first flat plate is adapted to be attached to. The first flat plate may be symmetrical about a plane perpendicular to the largest flat surface of the first flat plate and extending half way between the two first flat plate edges. A length of each of the two first flat plate edges may be less than half a minimum width or length of the frame. The first flat plate may be substantially in the shape of a triangle, trapezoid, square or rectangle. Substantially in that the first flat plate may also include holes, radii and chamfers. The first flat plate may be substantially in the shape of two rectangles connected with longitudinal axes of the rectangles orientated at between 70°-110°, preferably, 90° from each other.

The first flat plate may include ridges protruding from a largest flat surface of the first flat plate. The ridges may be adapted to provide structural support to the first flat plate.

The first flat plate may include an adhesive adapted to attach the first flat plate to the frame. The first flat plate may be adapted to use an adhesive to attach the first flat plate to the frame. The first flat plate may include frame holes positioned along at least two adjacent sides of the frame. The frame holes may be adapted to receive frame hole fasteners for attaching the first corner bracket to the frame. The frame hole fasteners may include nails and/or screws. Preferably, the frame hole fasteners include screws or press studs. The first corner bracket may include at least two frame holes. Preferably, the first corner bracket includes at least four frame holes. The wall hanging kit may include different sized first corner brackets adapted for use with different sized frames.

The first flat plate may include a fourth fastener hole. The first flat plate may include a female thread in the fourth fastener hole of the first flat plate. The fourth fastener may be adapted to be inserted, such as by being screwed, into the fourth fastener hole to be attached to the first flat plate.

The fourth fastener may not include a thread. The fourth fastener may be permanently fixed to the first flat plate or be in the form of a protrusion from the first flat plate. The fourth fastener may be a press stud or rivet attachable to the first flat plate. Preferably, the fourth fastener is a bolt and includes a thread. The fourth fastener may be a fourth bolt. The first corner bracket may include a fourth screw nut. The fourth screw nut may include a flange. The fourth screw nut may be adapted to be seated in the fourth fastener hole on a front or rear side of the first flat plate. The fourth screw nut may be flush with a largest flat surface of the first flat plate on the front or rear side of the first flat plate. The flange of the fourth screw nut may be adapted to limit a distance that the fourth screw nut can be inserted into the fourth fastener hole. The fourth fastener may be adapted to be inserted, such as by being screwed, into the fourth screw nut on the other of the front or rear side of the first flat plate, which is opposite the side which the fourth screw nut was inserted into, to attach the fourth fastener to the first flat plate. The fourth fastener may include a step, flange, or a radially extending feature with a larger diameter or thickness in a radial direction than the thread of the fourth fastener and is nominated step. The first corner bracket may be adapted such that the first flat plate is compressed between the flange of the fourth screw nut and the step of the fourth fastener to secure and attach the fourth fastener to the first flat plate.

The radially extending feature of the fourth fastener may be separate to the step of the fourth fastener. The radially extending feature of the fourth fastener may be spaced along the shaft of the fourth fastener from the step of the fourth fastener. The radially extending feature of the fourth fastener may be a head of the fourth fastener. The radially extending feature of the fourth fastener may include a larger diameter or largest width which is larger than a diameter or largest width of the shaft and/or step of the fourth fastener. The radially extending feature of the fourth fastener may be located at a first end of the fourth fastener. The thread of the fourth fastener may be located at a second end of the fourth fastener. The radially extending feature of the fourth fastener may extend out from the shaft of the fourth fastener at between 70°-110°, preferably, 90° to a longitudinal axis of the fourth fastener.

The head of the fourth fastener may include a fourth fastener feature to receive a tool. The fourth fastener feature may include a groove or protrusion adapted to receive a screw driver, wrench or other hand or power tool. Preferably, the fourth fastener feature includes a groove which is adapted to receive a Phillips head screw driver.

Second Corner Bracket

In this specification, descriptions of the first corner bracket may also describe the second corner bracket except that the fourth fastener may not be mountable to the second corner bracket and the second corner bracket includes the second corner bracket hole or slot. In this specification, descriptions of the first flat plate may also describe the second flat plate except that the fourth fastener may not be mountable to the second flat plate and the second corner bracket includes the second corner bracket hole or slot.

The second flat plate may include an adhesive adapted to attach the second flat plate to the frame. The second flat plate may be adapted to use an adhesive to attach the second flat plate to the frame. The second flat plate may include frame holes positioned on at least two adjacent sides of the frame. The frame holes may be adapted to receive the frame hole fasteners for attaching the second corner bracket to the frame.

The fifth fastener may be identical to the first, second and/or third fastener. Descriptions of the first, second and/or third fastener may also describe the fifth fastener.

The second corner bracket hole or slot may be cylindrical. The second corner bracket hole or slot may include a receiving hole with a diameter or shape and size larger than and adapted to receive the radially extending feature of the fifth fastener. Therefore, the radially extending feature of the fifth fastener may be able to be directly inserted through or taken out of the receiving hole. The second corner bracket hole or slot may further include a retaining slot with a diameter or minimum width smaller than a diameter or largest width of the radially extending feature of the fifth fastener. Therefore, the radially extending feature of the fifth fastener may not be able to be directly inserted through or taken out of the retaining slot. The retaining slot may be connected to the receiving hole such that when the portion of the shaft of the fifth fastener is inserted into the receiving hole it can then be moved directly to the retaining slot. In an orientation where the first corner bracket is attached to the frame and the frame is mounted on the wall with the fifth fastener, the retaining slot may be located above the receiving hole. Therefore, when the frame is attached to the wall with the second corner bracket, a weight of the frame may pull the second corner bracket downwards such that the portion of the shaft of the fifth fastener slides into and is held in the retaining slot with no other external forces other than gravity.

The second corner bracket may include spacers to be placed between the second flat plate and the frame. A hole may be drilled in the frame behind the second corner bracket hole or slot.

The second corner bracket may include protrusions from the second flat plate. The protrusions may be adapted to accurately position the second flat plate in a certain location on the frame. The protrusions may be adapted to be positioned adjacent a corner or edge of the frame when attaching the second corner bracket to the frame. Attaching the second flat plate to the frame may include holding the protrusions against the edge or corner of the frame while attaching the second flat plate to the frame. The protrusions may extend substantially perpendicular to a largest face of the second flat plate. Preferably, the protrusions follow the same shape as an inner corner of the frame. Preferably, the second corner bracket is adapted to be attached to the frame by positioning the protrusions adjacent the inner corner of the frame and edges of the frame which are adjacent the inner corner.

Dent Cap

The wall hanging kit may further include a dent cap. The dent cap may be adapted to make a small dent or mark on the wall for accurate positioning of the first screw, the first fastener and/or fifth fastener into the wall. The dent cap may be in the form of or include a cap or hollow cylinder with a closed end and an open end. The closed end of the hollow cylinder may include a dent cap feature protruding in a direction of a longitudinal axis of the dent cap. The longitudinal axis of the dent cap in this context means a longitudinal axis of internal cylindrical surfaces of the hollow cylinder of the dent cap. The dent cap feature may be a cone with a longitudinal axis coaxial with the longitudinal axis of the internal cylindrical surfaces of the dent cap. The cone may be pointing outwards, away from the hollow cylinder. The dent cap feature may include a dent cap point which is located on the longitudinal axis of the dent cap and is on a first end and end most point of the dent cap. The dent cap may further include a flange and outer cylindrical surfaces of the hollow cylinder. The dent cap may be adapted to be inserted into the fourth fastener hole and/or the second corner bracket hole or slot. The dent cap may be adapted such that the head of the second fastener, third fastener and/or fourth fastener can be removably inserted into the open end of the hollow cylinder of the dent cap which is on a second end of the dent cap and inside the hollow cylinder of the dent cap. The internal cylindrical surfaces of the hollow cylinder may include a diameter or minimum width larger than a diameter or largest lateral width of the head of the second fastener, third fastener and/or fourth fastener.

Spacers

The wall hanging kit may further include a spacer. The spacer may be made of materials including plastic, metal, wood or a composite such as fibreglass. Preferably, the spacer is made of materials including silicone. The spacer may include adhesive or be inherently adhesive on two large flat surfaces of the spacer. The spacer may be adapted to be glued or adhered to and between the object and the wall. The spacer may include a width between the two opposite sides of the spacer which is within 20%, preferably, 10% of the distance that the first fastener bracket, second fastener bracket, first corner bracket and/or second corner bracket space the object out from the wall. The spacer may be adapted to be adhered to a base of the object between the object and the wall. Therefore, the spacer may be adapted to orientate a rear face of the object and/or frame vertically or parallel to the wall.

Security Screw Bracket

The first fastener bracket may be a security screw bracket. The security fastener bracket may include a biased panel extending between the front flat plate and rear flat plate of the first fastener bracket. The biased panel may be attached to a spring and a hinge. The hinge may be attached to the rear flat plate above the first vertical slot. The spring may extend between the biased panel and the rear flat plate and/or front flat plate. Alternatively, the biased panel may be fixed to the rear flat plate and extend towards the front flat plate in the form of a cantilevered beam.

The biased panel may be orientated at an angle relative to the front and rear flat plates. Preferably, the biased panel is attached to the rear flat plate at or near a free end of the rear flat plate, which is opposite the bend, and extends downwards towards the closed bottom end of the second vertical slot. Preferably, the biased panel includes a spring bias and is orientated such that the second screw can be inserted into the first vertical slot but cannot be taken out of the closed bottom end of the first vertical slot without moving the biased panel. Therefore, the biased panel is adapted to lock the second fastener in the closed bottom end of the second vertical slot.

Method for the Screw Bracket

A method of attaching the object to the wall with the bracket or the first fastener bracket may include the following. The following method includes using two screw brackets to attach the object to the wall. All components and features of a bracket or a first fastener bracket, nominated fastener bracket A, are nominated with the addition of the letter "A": "component name A", such as first fastener A. All components and features of a second fastener bracket, nominated fastener bracket B, are nominated with the addition of the letter "B": "component name B", such as first fastener B. The bracket and the first fastener bracket are interchangeable and refer to the same component throughout the specification.

Inserting, such as by screwing, a second fastener A into a first of the two upper corners of the frame. Inserting, such as by screwing a second fastener B into a second of the two upper corners of the frame. Placing a first dent cap over the second fastener A and a second dent cap over the second fastener B such that the head of each second fastener A and B is inside the hollow cylinder of the respective dent cap. Placing a levelling device on either an outer vertical or horizontal edge of the object. Orientating the object in the desired orientation using the levelling device and pressing the dent caps into the wall making two small dents or marks on the wall with the dent cap point. Removing the dent caps from the second fasteners A and B.

Inserting, such as by screwing a first screw A part way into a first of the two dent marks. Inserting, such as by screwing a first fastener B part way into a second of the two dent marks. Placing a fastener bracket A on the first fastener A such that the portion of the shaft of the first fastener A is inserted into the open bottom end A of the first vertical slot A and slides into the closed top end A of the first vertical slot A. Then orientating the screw bracket A with a bend A being a lowermost most of the fastener bracket A and the first vertical slot A being vertical. Then inserting, such as by screwing the portion of the shaft of the first fastener A into the wall such that the rear side of the fastener bracket A is compressed between the first fastener A and the wall. As the first fastener bracket A is compressed against the wall, the outer spikes on the rear side of the fastener bracket A press into the wall and resist against rotation of the fastener bracket A about the first fastener A.

Placing a fastener bracket B on the first fastener B such that the portion of the shaft of the first fastener B is inserted into the open bottom end B of the first vertical slot B and slides into the closed top end B of the first vertical slot B. Then orientating the fastener bracket B with a bend B being a lowermost most point of the fastener bracket B and the first vertical slot B being vertical. Then inserting, such as by screwing, the first fastener B into the wall such that the rear side of the fastener bracket B is compressed between the first fastener B and the wall. As the fastener bracket B is compressed against the wall, the outer spikes on the rear side of the fastener bracket B are pressed into the wall and resist rotation of the fastener bracket B about the first fastener B.

Hanging or hooking the second fasteners A and B onto the fastener brackets A and B by inserting the portion A of the shaft A of the second fastener A into the open top end A of the second vertical slot A and inserting the portion B of the shaft B of the second fastener B into the open top end B of the second vertical slot B. Sliding or allowing the portions of the shaft of the second fastener A and B to slide into the closed bottom ends of the second vertical slots A and B. This concludes the method of attaching the object to the wall with the fastener brackets A and B.

Method for the Second Fastener Bracket

A method for attaching the object to the wall with the second fastener bracket is as follows. The following method includes using two second fastener brackets to attach the object to the wall. All components and features of a bracket or a first fastener bracket, nominated fastener bracket A, are nominated with the addition of the letter "A": "component name A", such as second fastener A. All components and features of a second fastener bracket, nominated fastener bracket B, are nominated with the addition of the letter "B": "components name B", such as second fastener B.

Inserting, such as by screwing a third fastener A into a first of two top corners of the frame. Inserting, such as by screwing a third fastener B into a second of the two top corners of the frame. Placing the first dent cap over the third fastener A and a second dent cap over the third fastener B such that the head of each third fastener A and B is inside the hollow cylinder of the respective dent cap. Placing the levelling device on either an outer vertical or horizontal edge of the object. Orientating the object in the desired orientation using the levelling device and pressing the dent caps into the wall making two small dents or marks on the wall with the dent cap point. Removing the dent caps from the third fastener A and B.

Placing a fastener bracket A against the wall and aligning the fastener bracket A such that the one of the two small dents is in a centre of the sight hole A by looking through the sight hole. Further aligning the fastener bracket A such that the longitudinal axis of the fastener bracket vertical slot A is orientated vertically and the open top end A is above the closed bottom end A of the fastener bracket vertical slot A. Nailing or inserting, such as by screwing, in the first fastener A through the first set of two registered holes A and into the wall. Adjusting alignment of the fastener bracket A, if necessary, such that the longitudinal axis of the fastener bracket vertical slot A is orientated vertically and the open top end A is above the closed bottom end A of the fastener bracket vertical slot A. Nailing or inserting, such as by screwing, in the second fastener A through the second set of two registered holes A and into the wall.

Placing the fastener bracket B against the wall and aligning the fastener bracket B such that the other of the two small dents is in a centre of the sight hole B by looking through the sight hole B. Further aligning the fastener bracket B such that the longitudinal axis of the second fastener bracket vertical slot 13 is orientated vertically and the open top end B is above the closed bottom end B of the fastener bracket vertical slot B. Nailing or inserting, such as by screwing, in the first fastener B through the first set of two registered holes B and into the wall. Adjusting alignment of the fastener bracket B, if necessary, such that the longitudinal axis of the fastener bracket vertical slot B is orientated vertically and the open top end B is above the closed bottom end B of the fastener bracket vertical slot B. Nailing or inserting, such as by screwing, in the second fastener B through the second set of two registered holes B and into the wall.

Hanging or hooking the object on the fastener brackets A and B by inserting the portion of the shaft of the third fasteners A and B into the open top end of the fastener bracket vertical slots A and B, respectively, and sliding the portion of the shaft of the third fastener A and B downwards to the closed bottom ends A and B of the fastener bracket vertical slots A and B, respectively. This concludes the method of attaching the object to the wall with the fastener brackets A and B.

Method for the First Corner Bracket

A method for attaching the object to the wall with the first corner bracket is as follows. The following method includes using two first corner brackets to attach the object to the wall. All components and features of one first corner bracket, nominated first corner bracket A, are nominated with the addition of the letter "A": "component name A", such as first flat plate A. All components and features of another first corner bracket, nominated first corner bracket B, are nominated with the addition of the letter "B": "components name B", such as first flat plate B.

Inserting and seating a fourth fastener nut A into a fourth fastener nut hole A of the first corner bracket A on a rear side A of the first corner bracket A. Inserting, such as by screwing, the fourth fastener A into the fourth fastener nut A on a front side A of the first corner bracket A, compressing the first corner bracket A between the fourth fastener nut A and the fourth fastener A and securing the fourth fastener A to the first corner bracket A. Inserting and seating a fourth fastener nut B into a fourth fastener nut hole B on a rear side B of the first corner bracket B. Inserting, such as by screwing, the fourth fastener B into the fourth fastener nut B on a front side B of the first corner bracket B, compressing the first corner bracket B between the fourth screw nut B and the fourth screw B and securing the fourth screw B to the first corner bracket B.

Attaching the rear side A of the first corner bracket A to a first of two top corners of the frame with the frame hole fasteners A through the frame holes A in the first corner bracket A. Attaching the rear side B of the first corner bracket B to a second of the two top corners of the frame with the frame hole fasteners B through the frame holes B in the first corner bracket B. Placing the first dent cap over the fourth fastener A and the second dent cap over the fourth fastener B such that the head of each fourth fastener A and B is inside the hollow cylinder of the respective dent caps. Placing the levelling device on either an outer vertical or horizontal edge of the object. Orientating the object in the desired orientation using the levelling device and pressing the dent caps A and B into the wall making two small dents or marks on the wall with the dent cap point. Removing the dent caps and from the respective fourth fastener A and B.

Attaching either the brackets A and B or the fastener brackets A and B to the wall at the location of the two small dents as above.

Inserting portions of the shafts A and B of the fourth fasteners A and B, respectively, into the open top ends A and B of the second vertical slots A and B, respectively, or into the open top ends of the fastener vertical slots A and B, respectively. Sliding the portions of the shafts A and B of the fourth fasteners A and B respectively down into the closed bottom ends A and B of the second vertical slots A and B, respectively, or into the closed bottom ends of the fastener vertical slots A and B, respectively. This concludes the method of attaching the object to the wall with the first corner brackets A and B.

Method for the Second Corner Bracket

A method for attaching the object to the wall with the second corner bracket is as follows. The following method includes using two second corner brackets to attach the object to the wall. All components and features of one second corner bracket, nominated second corner bracket A, are nominated with the addition of the letter "A": "component name A", such as second flat plate A. All components and features of another second corner bracket, nominated second corner bracket B, are nominated with the addition of the letter "B": "components name B", such as second flat plate B.

Attaching the rear side A of the second corner bracket A to a first of two top corners of the frame with the frame hole fasteners A through the frame holes A in the second corner bracket A. Attaching the rear side A of the second corner bracket B to a second of the two top corners of the frame with the frame hole fasteners B through the frame holes B in the second corner bracket B.

Placing the first dent cap into a second corner bracket hole or slot A and a second dent cap into a second corner bracket hole or slot B. Placing the levelling device on either an outer vertical or horizontal edge of the object. Orientating the object in the desired orientation using the levelling device and pressing the dent caps A and B into the wall making two small dents or marks on the wall with the dent cap point. Removing the dent caps from the respective second corner bracket hole or slots A and B.

Inserting, such as by screwing fifth screws A and B into each of the two small dents respectively. Inserting portions of shafts A and B of the fifth screws A and B respectively into receiving holes A and B of the second corner bracket holes or slots A and B respectively. Sliding the portions of the shafts A and B of the fifth screws A and B respectively upwardly relative to the object and into retaining slots A and B of the second corner bracket holes or slots A and B respectively. This concludes the method of attaching the object to the wall with the second corner brackets A and B.

It will be appreciated that any of the features described herein can be used in any combination, and that the invention as described in respect of the second aspect may have the specific features referred to above in respect of the invention as described in respect of the first aspect.

BRIEF DESCRIPTION OF THE DRAWINGS

The invention may be better understood from the following non-limiting description of preferred embodiments, in which:

FIG. 5 is a bottom perspective view of a first embodiment of a dent cap.
FIG. 6 is an upper perspective view of the first embodiment of the dent cap.
FIG. 7 is a side perspective view of the first embodiment of the dent cap.
FIG. 8 is a top view of the first embodiment of the dent cap.

DETAILED DESCRIPTION OF THE DRAWINGS

Figure 1:
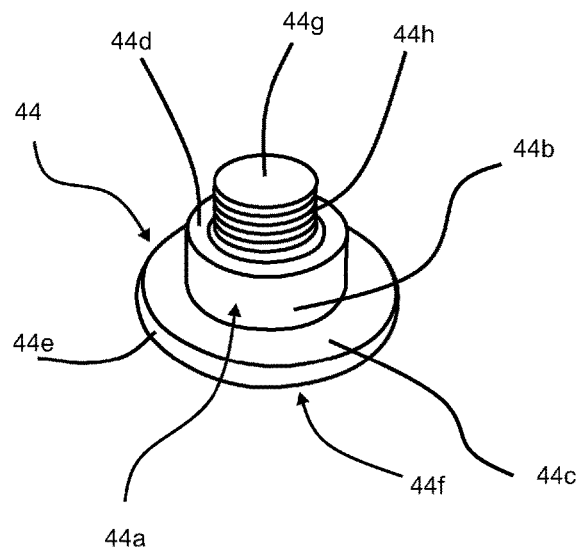
FIG. 1 is a bottom perspective view of a fourth screw.
Figure 2:
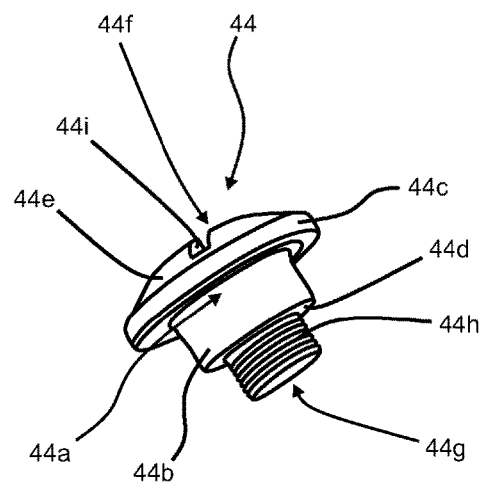
FIG. 2 is a side perspective view of the fourth screw.
Figure 3:
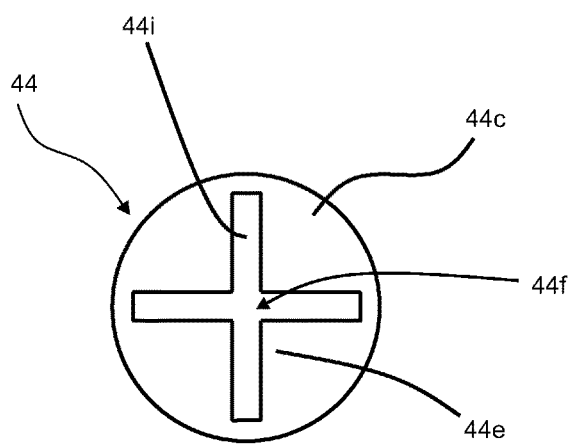
FIG. 3 is a top view of the fourth screw.
Figure 4:
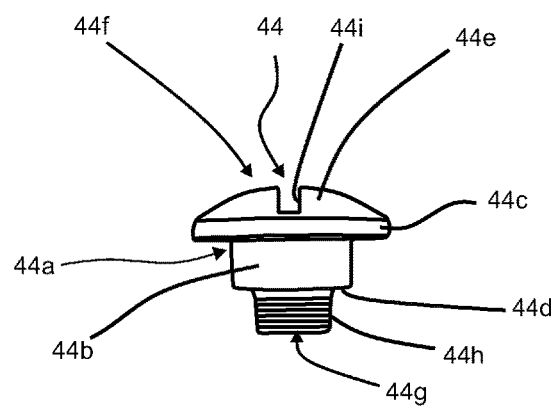
FIG. 4 is a side view of the fourth screw.
Figure 9:
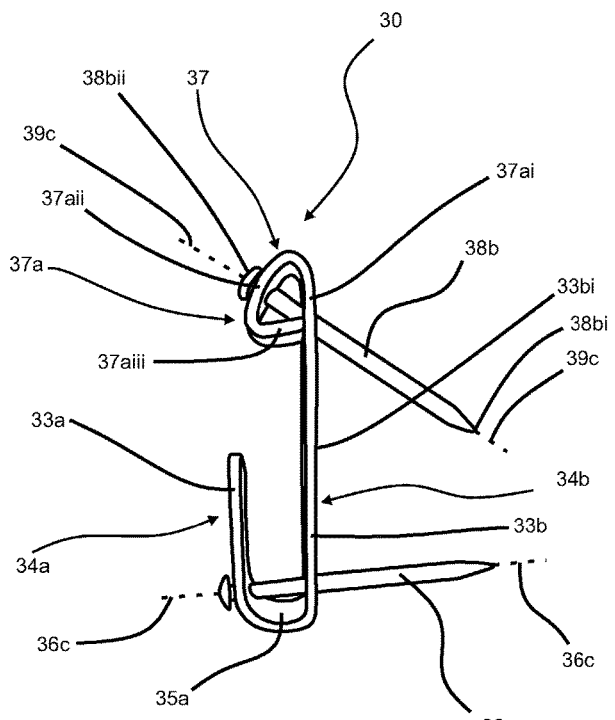
FIG. 9 is a right-side perspective view of a fastener bracket.
Figure 10:
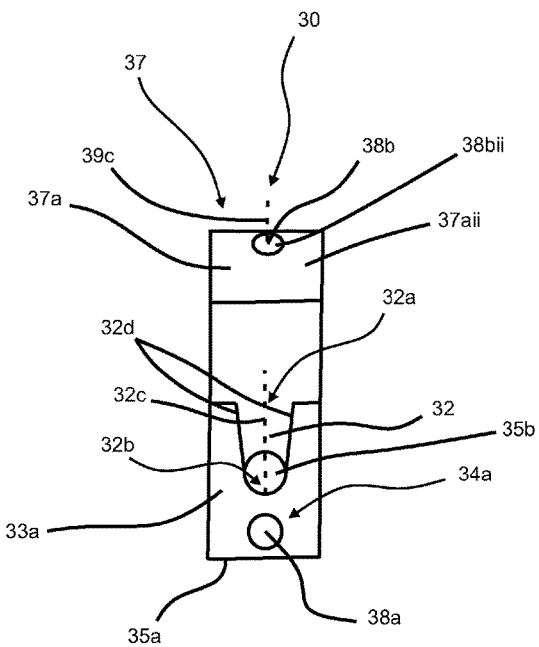
FIG. 10 is a front view of the fastener bracket.
Figure 11:
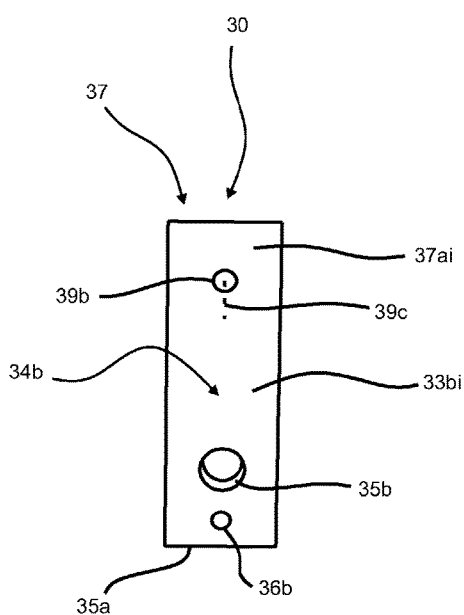
FIG. 11 is a rear view of the fastener bracket.
Figure 12:
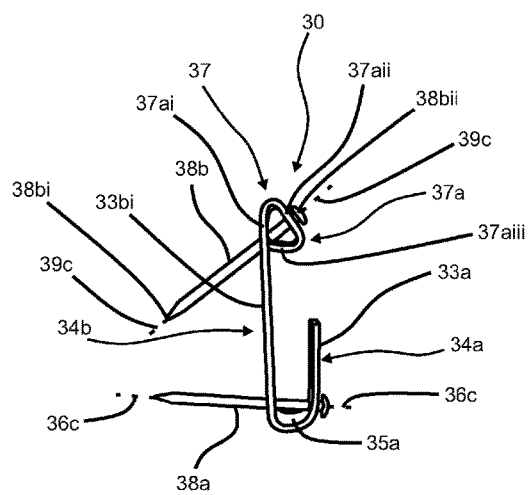
FIG. 12 is a left-side perspective view of the fastener bracket.
Figure 13:
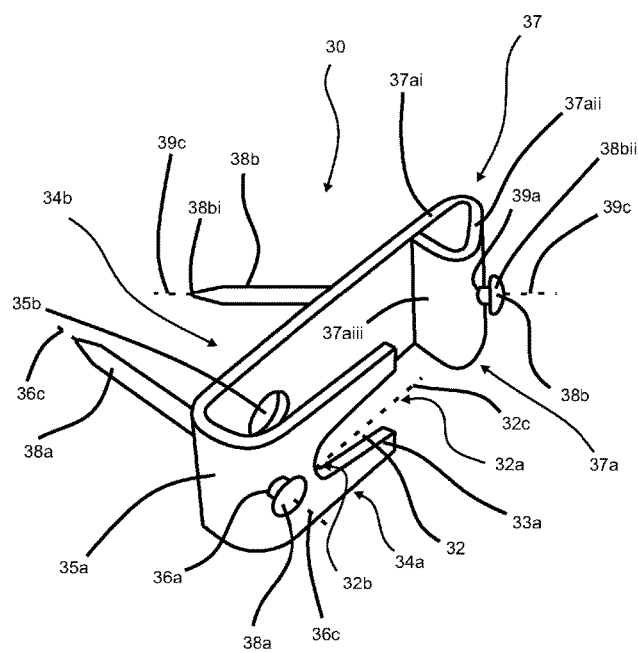
FIG. 13 is a left-side perspective view of the fastener bracket.
Figure 14:
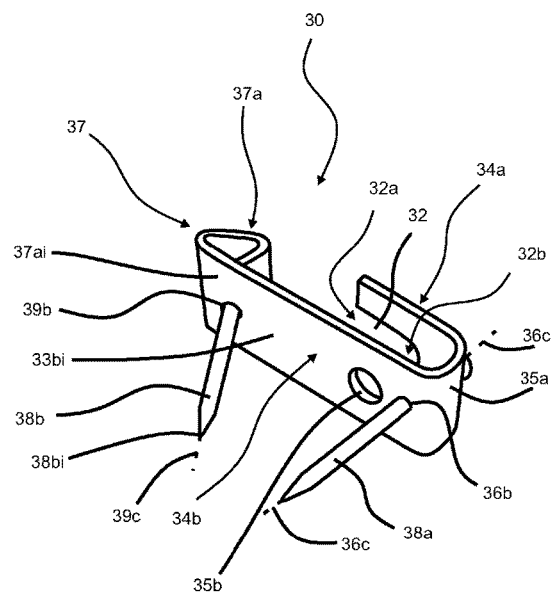
FIG. 14 is a rear perspective view of the fastener bracket.
Figure 15:
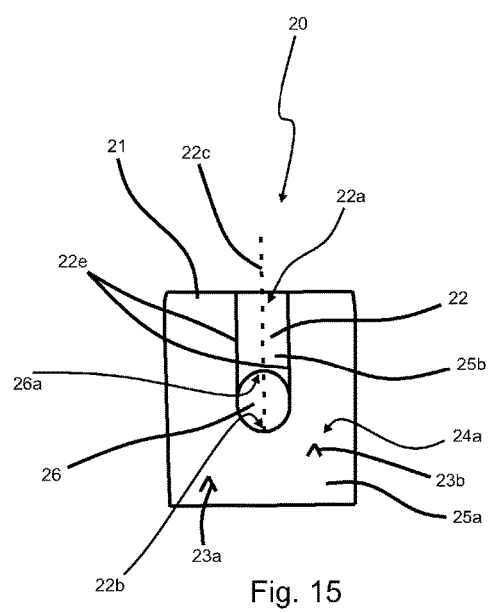
FIG. 15 is a front view of a screw bracket.
Figure 16:
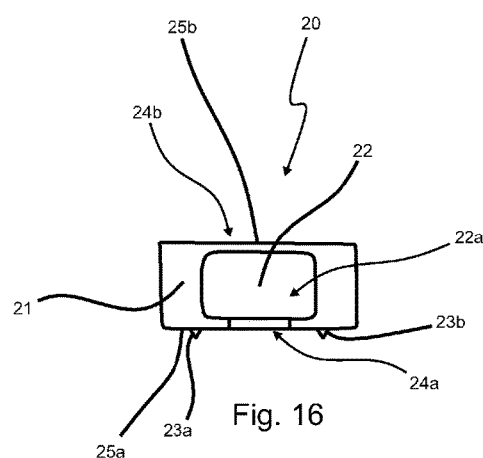
FIG. 16 is a top view of the screw bracket.
Figure 17:
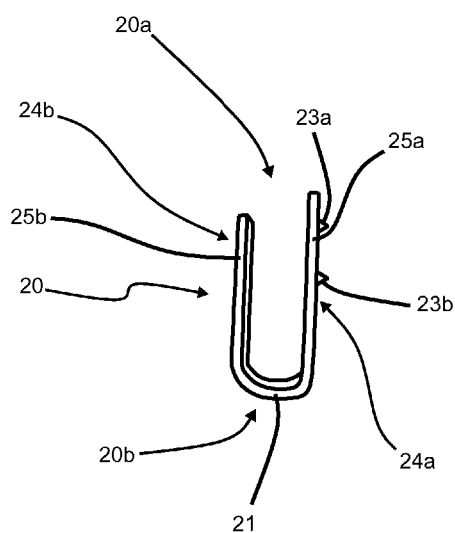
FIG. 17 is a right-side perspective view of the screw bracket.

Preferred features of the present invention will now be described with particular reference to the accompanying drawings. However, it is to be understood that the features illustrated in and described with reference to the drawings are not to be construed as limiting on the scope of the invention. In describing the various embodiments of the invention, like features will be referred to using like references, with references for features of each embodiment generally preceded by 1, 2, 3, or followed by a Roman numeric sequence, such as i, ii, iii, etc. or an alphabetical sequence such as a, b, c, relative to the corresponding feature of the first embodiment. For example, a feature 10 of the first embodiment may represented as 110, 210, 310, (or n10), or 10*a*, 10*b*, 10*c*, (or 10*x*) or 10*i*, 10*ii*, 10*iii*, (or 10*r*) etc. in second, third and fourth embodiments, respectively.

A wall hanging kit adapted to attach an object 10 weighing less than 40 kg and including a frame 11, to a wall 2. The wall hanging kit including at least one of the following: a bracket or first fastener bracket in the form of a screw bracket 20, a second fastener bracket in the faun of a fastener bracket 30, a first corner bracket 40 and a second corner bracket 50,50*i*.

The screw bracket 20 includes a first vertical slot 22 on a rear side or panel 24*a* of the screw bracket 20 and a second vertical slot 26 on a front side or panel 24*b* of the screw bracket 20. The first vertical slot 22 includes an open bottom end 22*a* and a closed top end 22*b*. The bracket 20 is unitarily formed from a single substantially rectangular piece that is folded about a curved bend 21 such that the front and rear sides 24*a,b* extend substantially in parallel planes relative to each other and extend upwards from the bend 21. The second vertical slot 26 includes a closed bottom end 26*a* which is closer to the bend 21 and an open top end 26*b* which is further away from the bend 21 and is at the terminal or free edge of the rear panel 24b. The second vertical slot 26 is adapted to receive an upper unthreaded portion 28a of a mainly threaded shaft 28b of a second fastener in the form of a second screw 28. The upper unthreaded portion (upper portion) 28a is adjacent and radially stepped down from a radially extending flange or feature 28c of a head 28e of the second screw 28. The first vertical slot 22 is adapted to receive a portion 29ai,aii of a shaft 29bi,bii of a first fastener in the form of a first screw 29i,ii. The portion 29ai,aii is adjacent or below a radially extending flange or feature 29ci,cii of a head 29ei of the first screw 29i,ii.

The second screw 28 is attachable to the object 10 and the first screw 29i,ii is attachable to the wall 2.

The fastener bracket 30 has a vertical slot 32 that is adapted to receive a portion 31a of a shaft 31b of a third fastener in the form of a third screw 31. The portion 31a is adjacent a radially extending feature 31c of the third screw 31. The third screw 31 is adapted to be attached to the object 10.

The first corner bracket 40 including a first flat plate 42. The first flat plate 42 mountable to the object 10. The first corner bracket 40 further including a fourth fastener in the form of a fourth screw 44 which is mountable to the first flat plate 42. A portion 44a of a shaft 44b of the fourth screw 44 is adjacent a radially extending feature 44c of the fourth screw 44 is adapted to be received by either the second vertical slot 22 or the fastener bracket vertical slot 32. The second corner bracket 50,50i including a second flat plate 52,52i which is mountable to the object 10. The second flat plate 52,52i including a second corner bracket hole or slot 54,54i which is adapted to receive a portion 56a of a shaft 56b of a fifth fastener in the form of a fifth screw 56, the portion 56a is adjacent a radially extending feature 56c of the fifth screw 56. The fifth screw 56 adapted to be attached to the wall 2.

The following passages describe the screw bracket 20 and components used with the screw bracket 20 which are shown in FIGS. 15-19, 29, 32-33. The wall hanging kit may include two screw brackets 20. The two screw brackets 20 are adapted to be attached to two upper corners 12a-b of the frame 11 respectively. The screw bracket 20 is substantially in the shape of the letter "U". The screw bracket 20 is in the form of a plate with a bend 21 between 160°-200°. The bend 21 spans between the front and rear sides 24a-b of the screw bracket 20. The rear and front sides 24a-b of the screw bracket 20 are "substantially" flat. The term "substantially" is used in the sense that the screw bracket 20 includes two outer spikes 23a-b on the rear panel 24a side of the screw bracket 20 which are adapted to be pressed into the wall 2 and resist rotation of the screw bracket 20 relative to the wall 2. The front side 24b of the screw bracket 20 includes a front flat plate 25bi which is spaced away from a rear flat plate 25ai which is on the rear side 24a of the screw bracket 20. The bend 21 connects and spans between the front flat plate 25bi and rear flat plate 25ai.

The words "top" and "bottom" of the open bottom end 22a, closed top end 22h, closed bottom end 26a and open top end 26b refer to an end of the respective first or second vertical slot 22, 26 which is closer to a top 20a of the screw bracket 20 or closer to a bottom 20b of the screw bracket 20 respectively. A top 20a of the screw bracket 20 includes cantilevered free ends of the front and rear flat plates 25bi,25ai. A bottom 20b of the screw bracket 20 includes the bend 21.

The screw brackets 20 are adapted to be attached to the wall 2 and the frame 11 in an orientation in which the first and second vertical slots 22, 26 include longitudinal axes 22c, 26c respectively which are orientated vertically. The longitudinal axes 22c, 26e of the first and second vertical slots 22, 26 are parallel to each other. The first and second vertical slots 22, 26 shown in FIGS. 15-19 may take each other's place in that the first screw 28 may be inserted into the second vertical slot 26 and the second screw 29 may be inserted into the first vertical slot 22.

The first vertical slots 22 each includes a first vertical slot profile which are in plane that are perpendicular to the longitudinal axis 22c of their first vertical slot 22 respectively. Likewise, the second vertical slots 26 each include a second vertical slot profile which are in planes that are perpendicular to the longitudinal axis 26c of the second vertical slots 26 respectively. An upper portion 28a of the shaft 28b forming an axially aligned spacer is located immediately below a head 28e of the second screw 28. The upper portion 28a of the shaft 28b is cylindrical and of a constant diameter throughout its length that is less than the diameter of the radial flange 28c. At its lower shoulder or step 28d, the upper portion 28a presents a larger diameter radial shoulder 28d than the widest end of the lower threaded portion 28b. The shoulder or step 28d steps down and inwardly radially to the widest end of an elongate threaded and tapered shaft portion 28j that terminates in a pointed tip 28f.

The first vertical slot profile is "T" shaped through the bend 21 and rectangular through the front flat plate 25ai. The second vertical slot profile is rectangular. The first vertical slot 22 is T-shape shaped whereby the cross-arm 22a of the "T" extends transversely relative to a main leg 22b of the slot 22. The cross-arm 22a extends longitudinally along an intermediate region of the bend 21 and represents an open top end 22a and the main leg represents a closed bottom end 22b.

Figure 32:
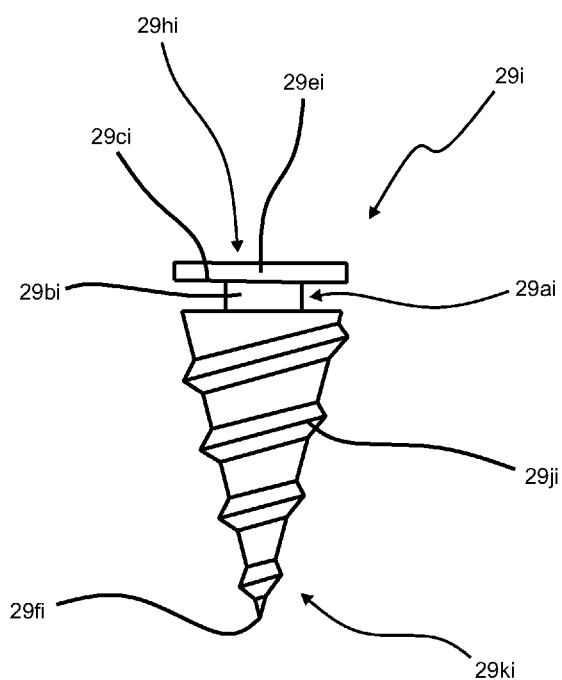
FIG. 32 is a front view of a first embodiment of a first screw.
Figure 33:
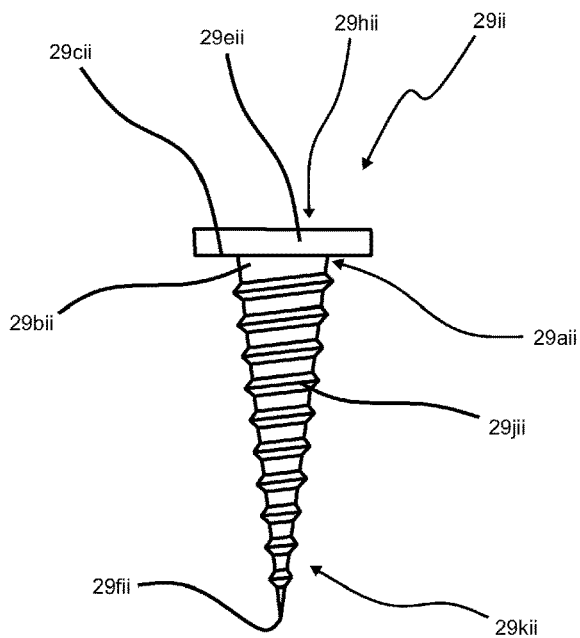
FIG. 33 is a front view of a second embodiment of the first screw.
Figure 34:
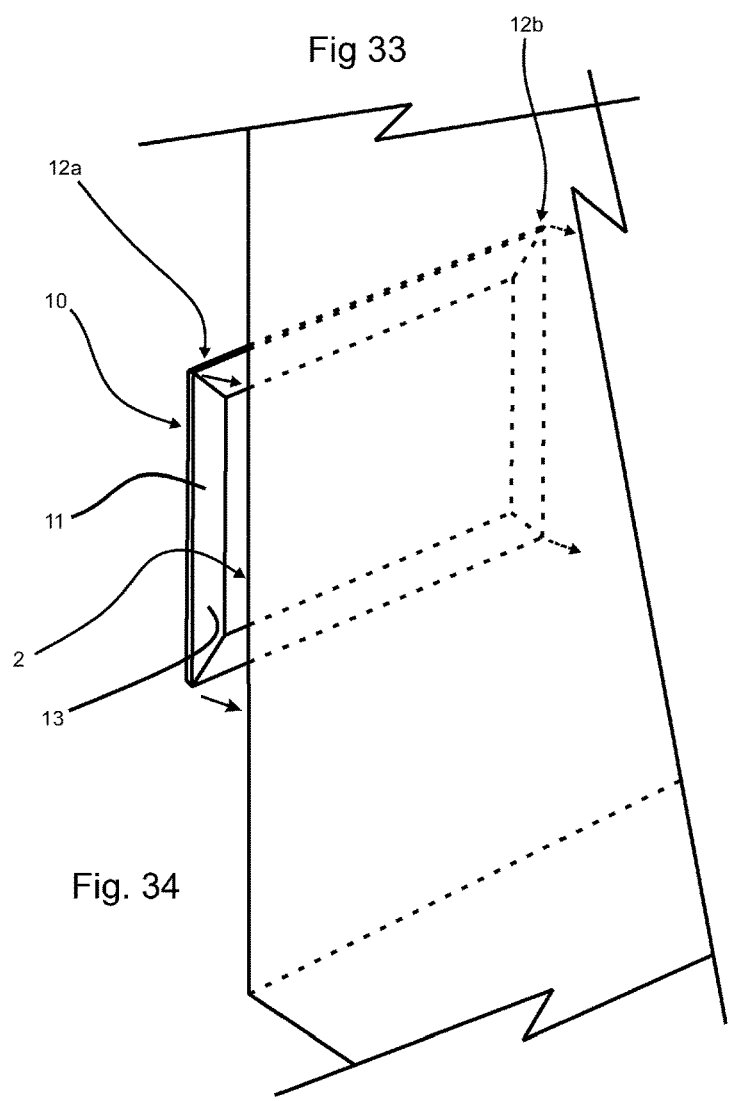
FIG. 34 is a rear perspective view of a frame, object and wall.

A first embodiment of the first screw 29i, portion 29ai of the shaft 29bi of the first screw 29i and a head 29ei of the first screw 29i is shown in FIG. 32. A second embodiment of the first screw 29ii, portion 29aii of the shaft 29bii of the first screw 29ii and a head 29eii of the first screw 29ii is shown in FIG. 33. The first embodiment of the first screw 29i is adapted to be screwed into plasterboard or dry wall. The second embodiment of the first screw 29ii is adapted to be screwed into wood such as wooden wall studs. The second and first screws 28,29i,ii include a head 28e,29ei,eii, respectively, at a first end 28h,29hi,hii of the second and first screws 28, 29i,ii, respectively. Each head 28; 29ei,eii includes the radially extending feature 28c, 29c, respectively.

A step or flange 28d on the shaft 28b of the second screw 28 includes a larger diameter which is closer to the first end 28h and steps down to a smaller diameter on a thread 28j of the second screw 28, the larger diameter being larger than the smaller diameter. The thread 28j is on a second end 28k of the second screw 28. The step 28d is adapted to limit a distance that the second screw 28 can be screwed into the frame 11. The step 28d is adapted to act as a barrier such that the second screw 28 cannot be screwed into the frame 11 further than the step 28d. The first and second embodiments of the first screw 29i,ii each include a thread 29ji,jii on second ends 29ki,kii of the first screws 29i,ii respectively. The thread 29ji of the first embodiment of the first screw 29i is a very coarse thread. The thread 29jii of the second embodiment is a finer or less coarse thread 29jii than the very coarse thread.

The threads 28j, 29ji,jii of the second and first screws 28,29i,ii are tapered from the first ends 28h,28hi,hii down to a tip 28*f*, 29*fi,fii* of the second and first screw 28,29*i,ii*, respectively. The tips 28*f*, 29*fi,fii* being where the second and first screws 28, 29*i,ii* are first inserted into the frame 11 and wall 2 respectively and are on the opposite end 28*k*,29*ki,kii* of the second and first screw 28,29*i,ii* to the head 28*e*,29*ei, eii* of the second and first screw 28,29*i,ii*, respectively. The upper faces of the heads 28*e*,29*ei,eii* of the second and first screw 28,29*i,ii* each include a key feature, such as a hex, slot or star key, which is adapted to receive a tool, such as a hex key or screwdriver, for screwing the second and first screw 28,29*i,ii*, respectively.

When the portion 28*a* of the shaft 28*b* of the second screw 28 is inserted into the second vertical slot 26, the second vertical slot 26 is adapted to restrict lateral movement and be a laterally close fit of the second screw 28 in the second vertical slot 26.

When the portion 29*ai,aii* of the shaft 29*bi,bii* of the first screws 29*i,ii* are inserted into the first vertical slot 22, the screw bracket 20 is adapted to restrict lateral movement and be a laterally close fit of the first screw 29*i,ii* in the first vertical slot 22.

The heads 28*e*, 29*ei,eii* and radially extending flanges 28*c*, 29*ci,cii* of the second and first screws 28,29*i,ii* each include a largest diameter or largest outer width in a lateral direction perpendicular to longitudinal axes of the second and first screws 28,29, respectively, which is larger than a largest width of the closed top end 22*b* and closed bottom end 26*a* of the second and first vertical slots 26,22, respectively. The largest width of the first and second vertical slot 22,26 extends in a direction perpendicular to the longitudinal axes 22*c*,26*c* of the first and second vertical slots 22,26 respectively. Therefore, when the portions 28*a*,29*ai,aii* of the shafts 28*b*,29*bi,bii* of the second and first screws 28,29*i, ii* are positioned in the closed bottom end 26*a* of the second vertical slot 26 and closed top end 22*b* of the first vertical slot 22, respectively, axial movement of the second and first screws 28, 29 are restricted and the second and first screws 28, 29*i,ii* are axially trapped in the second and first vertical slots 26,22, respectively, between the heads 28*e*,29*ei,eii* and frame 11 or wall 2, respectively. The axial movement is aligned with longitudinal axis of the second and first screws 28, 29.

The first vertical slot 22 extends through the rear flat plate 25*ai* and the bend 21, but does not extend into the front flat plate 25*bi*. The second vertical slot 26 extends solely through the front flat plate 25*bi*. The first vertical slot 22 is in the form of a cut out extending through an entire thickness of the rear flat plate 25*ai* and the bend 21. The second vertical slot 26 is in the form of a cut out extending through an entire thickness of the front flat plate 25*bi*. The cut outs are advantageously formed when the screw bracket 20 pre-form plate is a flat rectangular plate. The cut plate is then bent intermediate the length of the pre-form plate to form a curve about the cross-arm (open bottom end) 22*a* to form the bend 21. The curve has a diameter d that is near to a width of the cross-arm 22*a*, the width being in a direction from the rear flat plate 25*ai* to the front flat plate 25*bi*. The spacing is sufficient between the front and rear sides 24*b,a* to accommodate therebetween the screw head 29*ei,eii* inserted through the cross-arm 22*a* portion of the first vertical slot 22.

Figure 18:
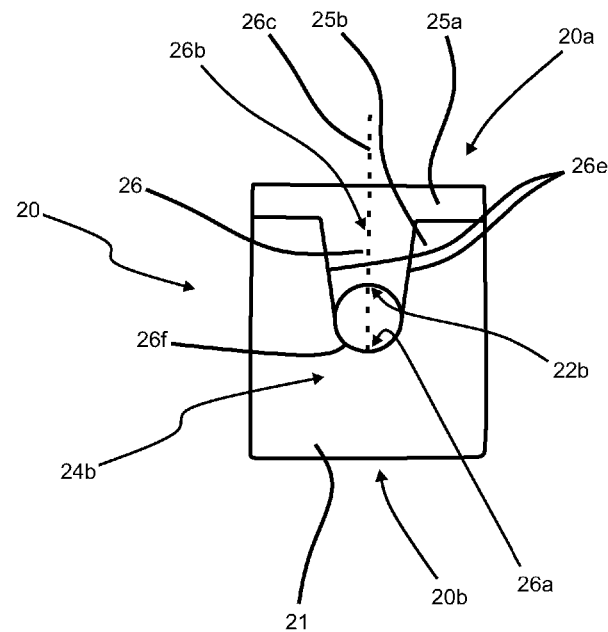
FIG. 18 is a rear view of the screw bracket.
Figure 19:
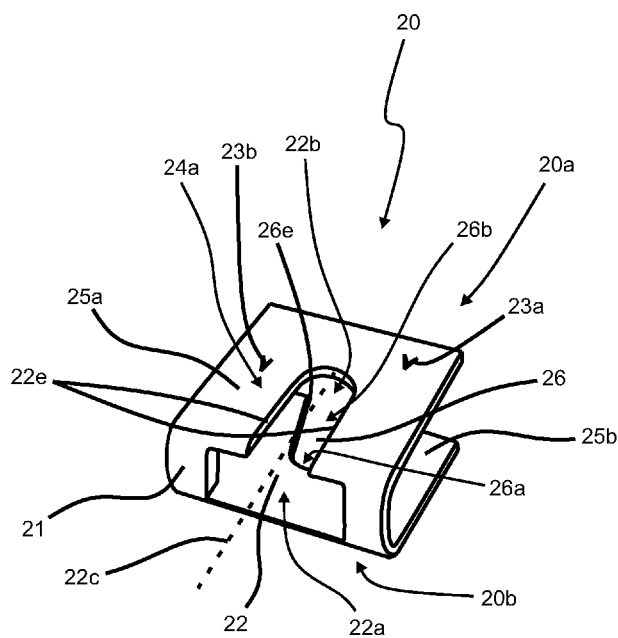
FIG. 19 is a front perspective view of the screw bracket.
Figure 20:
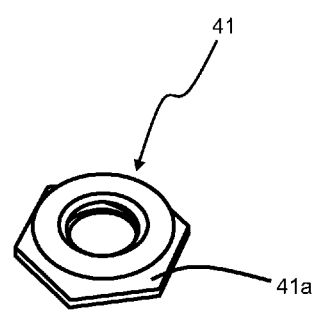
FIG. 20 is a front perspective view of a fourth screw nut.
Figure 21:
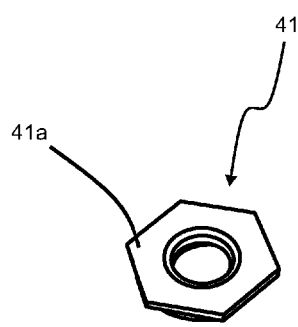
FIG. 21 is a rear perspective view of the fourth screw nut.
Figure 22:
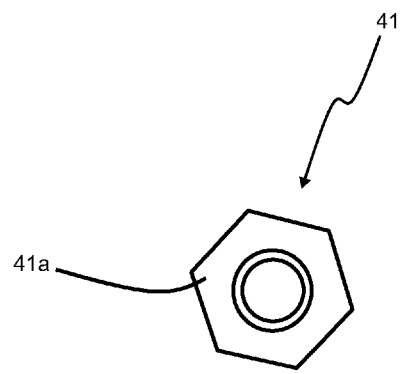
FIG. 22 is a rear view of the fourth screw nut.
Figure 23:
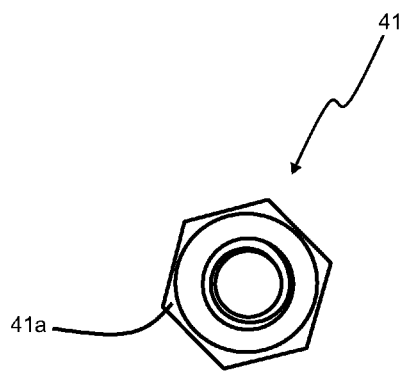
FIG. 23 is a front view of the fourth screw nut.
Figure 24:
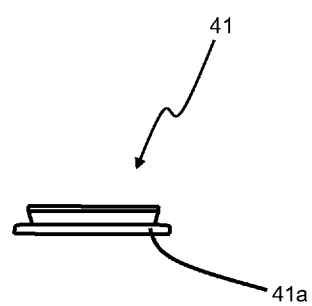
FIG. 24 is a side view of the fourth screw nut.
Figure 25:
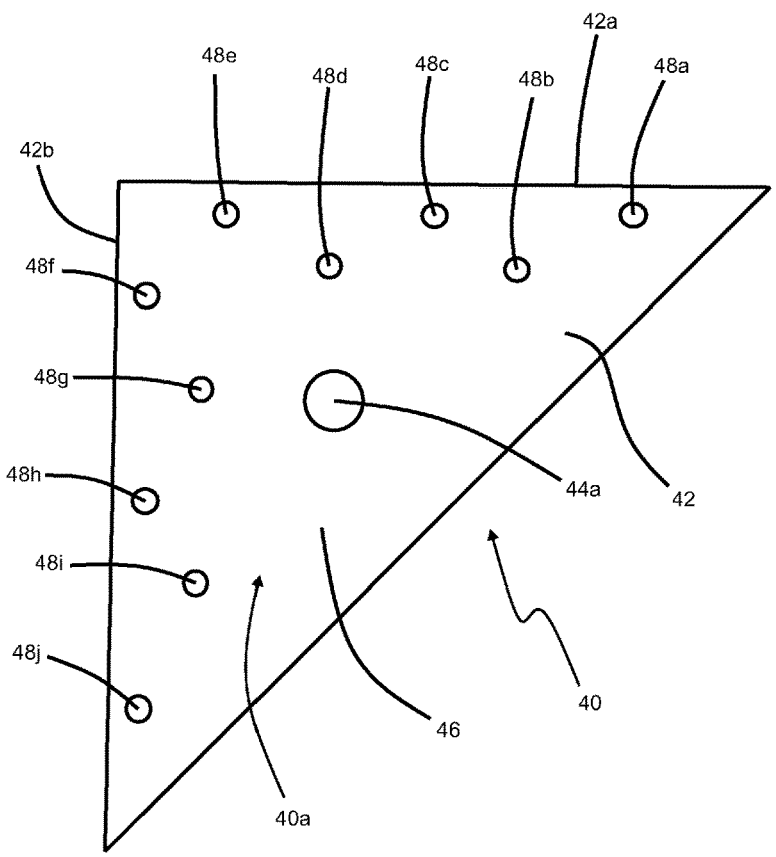
FIG. 25 is a front or rear view of a first corner bracket.
Figure 26:
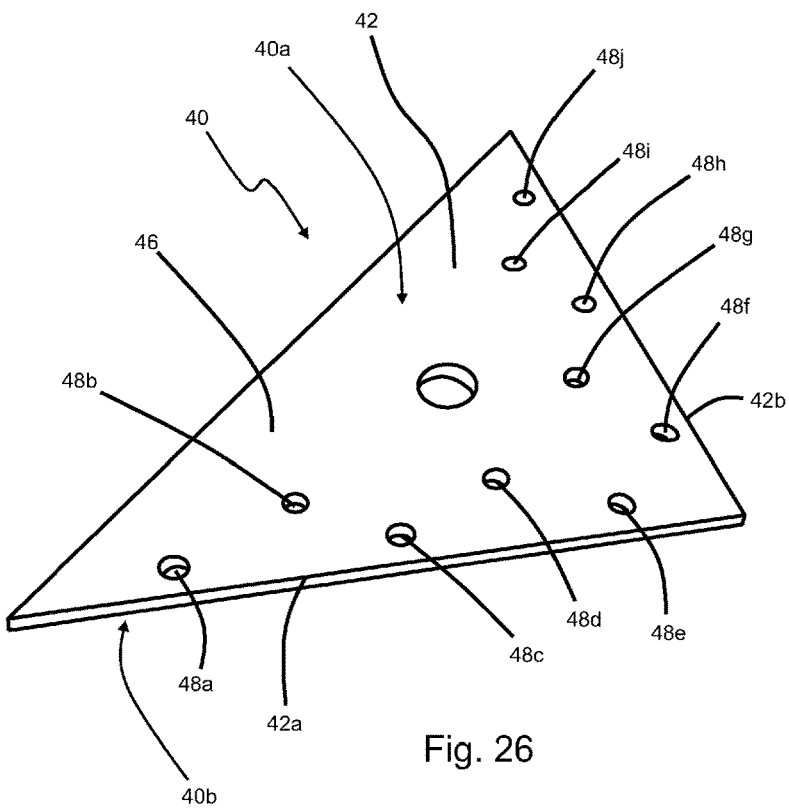
FIG. 26 is a front or rear perspective view of the first corner bracket.

Longitudinal sides 22*e* of the first vertical slot 22 are substantially linear and parallel to each other. Longitudinal sides 26*e* of the second vertical slot 26 are orientated at an angle between 20°-25° and diverge relative to each other in the shape of a truncated "V" towards the open top end 26*b* as shown in FIG. 18. The longitudinal sides 26*e* terminate at the second vertical slots 26 closed bottom end 26*a* in a semicircular aperture 26*f* that has a radius $R_1$ that is similar to the radius $R_2$ of the closed top end 22*b* of the first vertical slot 22.

The open top end 26*b* of the second vertical slot 26 may be open in that the upper portion 28*a* of the screw shaft 28*a* can be directly inserted into or taken out of the open top end 26*b* from inside and out of the second vertical slot 26, respectively. Thereby the screw head 28*e* may be inserted into the open top end 26*b* and trapped on the underside of the front flat plate 25*ai*. The closed bottom end 26*a* may be closed in that the portion 28*a* of the shaft 28*a* of the second screw 28 cannot be directly inserted into or taken out of the closed bottom end 26*a* from inside and out of the second vertical slot 26, respectively. The closed top end 22*b* of the first vertical slot 22 may be closed in that the portion 29*a* of the shaft 29*b* of the first screw 29 cannot be directly inserted into or taken out of the closed top end 22*b*. The open bottom end 22*a* of the first vertical slot 22 may be open in that the portion 29*a* of the shaft 29*b* of the first screw 29 can be directly inserted into or taken out of the open bottom end 22*a* from or to inside the second vertical slot 22, respectively.

The screw bracket may be a security screw bracket. The security screw bracket includes a biased panel extending between the front flat plate 25*bi* and rear flat plate 25*ai* of the screw bracket. The biased panel may be attached to a spring and a hinge. The hinge may be attached to the rear flat plate 25*ai* above the first vertical slot 22. The spring may extend between the biased panel and the rear flat plate 25*ai* and/or front flat plate 25*bi*. Alternatively, the biased panel may be fixed to the rear flat plate 25*ai* and extend towards the front flat plate 25*bi* in the form of a cantilevered beam.

The biased panel may be orientated at an angle relative to the front and rear flat plates 25*bi,ai*. Preferably, the biased panel is attached to the rear flat plate 25*ai* at or near a free end of the rear flat plate 25*ai*, which is opposite the bend 21, and extends downwards towards the closed bottom end 26*a* of the second vertical slot 26. Preferably, the biased panel includes a spring bias and is orientated such that the second screw 28 can be inserted into the first vertical slot 22 but cannot be taken out of the closed bottom end 22*b* of the first vertical slot 22 without moving the biased panel. Therefore, the biased panel is adapted to lock the second screw 28 in the closed bottom end 26*a* of the second vertical slot 26.

The following passages describe the fastener bracket 30 and components used with the fastener bracket 30 shown in FIGS. 9-14, 29. The wall hanging kit may include two fastener brackets 30. The two fastener brackets 30 are adapted to be attached to two upper corners 12*a,b* of the frame 11 respectively. The fastener bracket 30 is made of copper or brass. The fastener bracket 30 is in the form of a bent plate in which the pre-bent form is a flat rectangular plate. The fastener bracket 30 includes a fastener bracket vertical slot 32 on a front side 34*a* of the fastener bracket 30. The fastener bracket vertical slot 32 includes an open top end or mouth 32*a* whereby the slot 32 tapers or narrows towards a closed bottom end 32*b*. The fastener bracket 30 further includes a first set of at least two registered holes 36*a-b* respectively located in the front and rear sides 34*a,b* that are adapted to receive a first fastener 38*a* preferably in the form of an unthreaded nail. The first fastener 38*a* is adapted to extend out a rear side 34*b* of the fastener bracket 30.

A second set of at least two registered holes 39*a* are adapted to receive a second fastener 38*b* the pointed end of which can extend out of the rear side 34*b* of the fastener bracket 30. The fastener bracket 30 is adapted to be mounted to the wall 2 with the first and second fasteners 38a-b such that the rear side 34b of the fastener bracket 30 is in contact with the wall 2.

The fastener bracket 30 includes a front vertical plate 33a substantially in the form of a fork which is located on the front side 34a. The rear side 34b of the fastener bracket 30 is adapted to contact the wall 2 and the front side 34a is adapted to contact the frame 11. The front vertical plate 33a is a flat plate comprising a bifurcated pair of arms that define the slot 32. The front vertical plate 33a includes the fastener bracket vertical slot 32. The fastener bracket vertical slot 32 is a cut out which extends completely through a whole thickness of the front vertical plate 33a.

The fastener bracket 30 is adapted to be attached to the wall 2 and the frame 11 in an orientation in which the fastener bracket vertical slot 32 includes a longitudinal axis 32c which is orientated vertically.

The fastener bracket vertical slot 32 includes a fastener bracket vertical slot profile which is perpendicular to the longitudinal axis 32c of the fastener bracket vertical slot 32. The fastener bracket vertical slot profile is sized and shaped to receive the portion 31a of the shaft 31b of the third screw 31. The third screw profile is a profile in a plane through a longitudinal axis of the third screw 31. The fastener bracket vertical slot profile is rectangular.

In this specification, a closed side or end of a slot may include a wall or internal surface of the slot and an open side of the slot may include a hole or opening.

Longitudinal sides 32d of the fastener bracket vertical slot 32 are orientated at an angle between 20°-25° from each other.

The open top end 32a of the fastener bracket vertical slot 32 is open in that the portion 31a of the shaft 31b of the third screw 31 can be directly inserted and taken out of the open top end 32a from inside the fastener bracket vertical slot 32. The closed bottom end 32b of the fastener bracket vertical slot 32 is closed in that the portion 31a of the shaft 31b of the third screw 31 cannot be taken directly out of the closed bottom end 32b from inside the fastener bracket vertical slot 32.

A head 31e on a first end 31h of the third screw 31 and the radially extending feature 31c of the third screw includes a largest diameter or largest outer width in a direction perpendicular to a longitudinal axis of the third screw 31 which is larger than a largest width of the closed bottom end 32b of the fastener bracket vertical slot 32. The largest width of the fastener bracket vertical slot 32 being in a direction perpendicular to the longitudinal axis 32c of the fastener bracket vertical slot 32. Therefore, when the portion 31a of the shaft 31b of the third screw 31 is positioned in the closed bottom end 32b of the fastener bracket vertical slot 32, axial movement of the third screw 31 is restricted and the third screw 31 is axially trapped in the fastener bracket vertical slot 32 between the head 31e and the frame 11. "Axially" means in a direction along a longitudinal axis of the third screw 31.

A step 31d on the shaft 31b of the third screw 31 includes a larger diameter which is closer to the first end 31h and steps down to a smaller diameter on a thread 31j of the third screw 31. The thread 31j is on a second end 31k of the third screw 31. The step 31d is adapted to limit a distance that the third screw 31 can be screwed into the frame 11. The step 31d is adapted to act as a barrier such that the third screw 31 cannot be screwed into the frame 11 further than the step 31d. The thread 31j of the third screw 31 is tapered from the step 31d down to a tip 31f of the second end 31k of the third screw 31. The tip 31f is where the third screw 31 is first inserted into the frame 11.

The fastener bracket 30 includes a rear vertical plate 33b. The rear vertical plate 33b is a flat plate. The rear vertical plate 33b is formed of the same plate as the front vertical plate 33a. The fastener bracket 30 includes a bend 35a spanning between and connecting the rear vertical plate 33b to the front vertical plate 33a. The rear vertical plate 33b is parallel to the front vertical plate 33a. The rear vertical plate 33b includes a sight hole 35b adapted to allow the user to view a mark in the wall 2 through the sight hole 35b to line up and attach the fastener bracket 30 to the wall 2 over a mark in the wall created by a dent cap 60i,ii. When the fastener bracket 30 is attached to the wall 2, the sight hole 35b is vertically level with the closed bottom end 32b of the fastener bracket vertical slot 32. The sight hole 35b is coaxial with the closed bottom end 32b of the fastener bracket vertical slot 32.

The first set of at least two registered holes 36a-b only include two registered holes 36a-b. The first set of at least two registered holes 36a-b extends through the bend between the rear vertical plate 33b and the front vertical plate 33a. The first set of least two registered holes 36a-b are coaxial with each other. The first fastener 38a is straight and linear and can extend through all the at least two registered holes 36a-b of the first set.

A top 37 of the fastener bracket 30 is in the form of a triangular prism 37a. The triangular prism 37a is formed from bends in the bent plate of the fastener bracket 30. The rear vertical plate 33b forms a first side 37ai of the triangular prism 37a. A second side 37aii of the triangular prism 37a extends from the rear vertical plate 33b at an acute angle of between 30°-50°. A third side 37aiii of the triangular prism extends from the second side 37aii at an acute angle between 35°-55°.

The second set of at least two registered holes 39a-b extend through the second side 37aii of the triangular prism 37a and the first side 37ai of the triangular prism 37a. The at least two registered holes 39a-b of the second set only include two registered holes 39a-b. A first 39a of the at least two registered holes 39a-b of the second set extend through the second side 37aii of the triangular prism 37a and a second 39b of the at least two registered holes 39a-b of the second set extend through the first side 37ai of the triangular prism 37a. The at least two registered holes 39a-b of the second set are all coaxial with each other. The second fastener 38b is straight and linear and is adapted to extend through all the at least two registered holes 39a-b of the second set.

The following descriptions of a first line 36c which is through the first set of at least two registered holes 36a-b also applies to a longitudinal axis 36c of the first fastener 38a and features described in each case are interchangeable with the other case. The following descriptions of a second line 39c which is through the second set of at least two registered holes 39a-b also applies to a longitudinal axis 39c of the second fastener 38b and features described in each case are interchangeable with the other case. The rear vertical plate 33b includes a rear surface 33bi which is adapted to contact the wall 2. The first line 36c is orientated at an acute angle between 0°-10° from perpendicular to the rear vertical plate 33b and/or the rear surface 33bi. Furthermore, the first line 36c is orientated in a first plane which is vertical and perpendicular to the rear surface 33bi. The second line 39c is orientated at an acute angle between 50°-70° from the rear surface 33bi. The second line 39c is orientated downwards in a direction from the front side 34*a* of the fastener bracket 30 to the rear side 34*b* of the fastener bracket 30. The fastener bracket 30 is adapted such that when the fastener bracket attaches the frame 11 to the wall 2, a sharp end 38*bi* of the second fastener 38*b* is vertically lower than a head 38*bii* of the second fastener 38*b*. Furthermore, the second line 39*c* is orientated in the first plane.

The first and second fasteners 38*a*-*b* are nails. The fastener bracket 30 is adapted such that the first fastener 38*a* is first inserted through the first set of at least two registered holes 36*a*-*b* and then the second fastener 38*b* is inserted through the second set of at least two registered holes 39*a*-*b*.

The following passages describe the first corner bracket 40 and components used with the first corner bracket shown in FIGS. 1-4 and 20-26. The wall hanging kit includes two first corner brackets 40. The two first corner brackets 40 are adapted to be attached to the two upper corners 12*a*-*b* of the frame 11 respectively. A first of the two first corner brackets 40 is adapted to be attached to a first 12*a* of the two upper corners 12*a*-*b* and a second of the two first corner brackets 40 are adapted to be attached to a second 12*b* of the two upper corners 12*a*-*b*. The two upper corners 12*a*-*b* being on the top of the frame 11 with the frame 11 in an orientation in which it is attached to the wall 2. The two first corner brackets 40 may be sized and shaped such that they do not overlap each other when attached to the two upper corners 12*a*-*b* of the frame 11.

The first flat plate 42 is symmetrical about a plane perpendicular to a largest flat surface 46 of the first flat plate 42. The first flat plate 42 is substantially in the shape of a triangle. Substantially in that the first flat plate 42 may also include holes, radii and chamfers. A length of each of two first flat plate edges 42*a*-*b* of the first flat plate 42 are adapted to be less than half a minimum width or length of the frame 11.

The first flat plate 42 further includes frame holes 48*a*-*j* positioned on two adjacent sides of the frame and along the two first flat plate edges 42*a*-*b*. The frame holes 48*a*-*j* are adapted to receive frame hole fasteners for attaching the first corner bracket to the frame. The frame hole fasteners may include nails and/or screws. The wall hanging kit may include different sized first corner brackets 40 adapted to be selectively used with different sized frames 11.

The first flat plate 42 includes a fourth screw hole 44*a*. The fourth screw hole 44*a* does not include a thread. The fourth screw 44 is a bolt and includes a thread 44*h*. The first corner bracket 40 includes a fourth screw nut 41. The fourth screw nut 41 includes a flange 41*a*. The fourth screw nut 41 is adapted to be seated in the fourth screw hole 44*a* on either of a front side 40*a* or rear side 40*b* of the first flat plate 40. The flange 41*a* of the fourth screw nut 41 is adapted to limit a distance that the fourth screw nut 41 can be inserted into the fourth screw hole 44*a*. The fourth screw 44 is adapted to be screwed into the fourth screw nut 41 on the other of the front side 40*a* or the rear side 40*b* of the first flat plate 42, to attach the fourth screw 44 to the first flat plate 42. The shaft 44*b* of the fourth screw 44 includes a step 44*d* with a larger diameter or thickness in a radial direction than the thread 44*h* of the fourth screw 44. The first corner bracket 40 is adapted such that the first flat plate 42 is compressed between the flange 41*a* of the fourth screw nut 41 and the step 44*d* of the fourth screw 44 to secure and attached the fourth screw 44 to the first flat plate 42.

The radially extending feature 44*c* of the fourth screw 44 is separate to the step 44*d* of the fourth screw 44. The step 44*d* is adjacent the thread 44*h* of the fourth screw 44. A head 44*e* of the fourth screw 44 includes the radially extending feature 44*c* of the fourth screw 44. The radially extending feature 44*c* of the fourth screw includes a larger diameter or largest width which is larger than a diameter or largest width of the step 44*d* of the fourth screw 44. The radially extending feature 44*c* and head 44*e* of the fourth screw 44 are located on a first end 44*f* of the fourth screw 44. The thread 44*h* of the fourth screw 44 is located at a second end 44*g* of the fourth screw 44. The head 44*e* of the fourth screw 44 includes a groove 44*i* which is adapted to receive a Phillips head screw driver.

Figure 27:
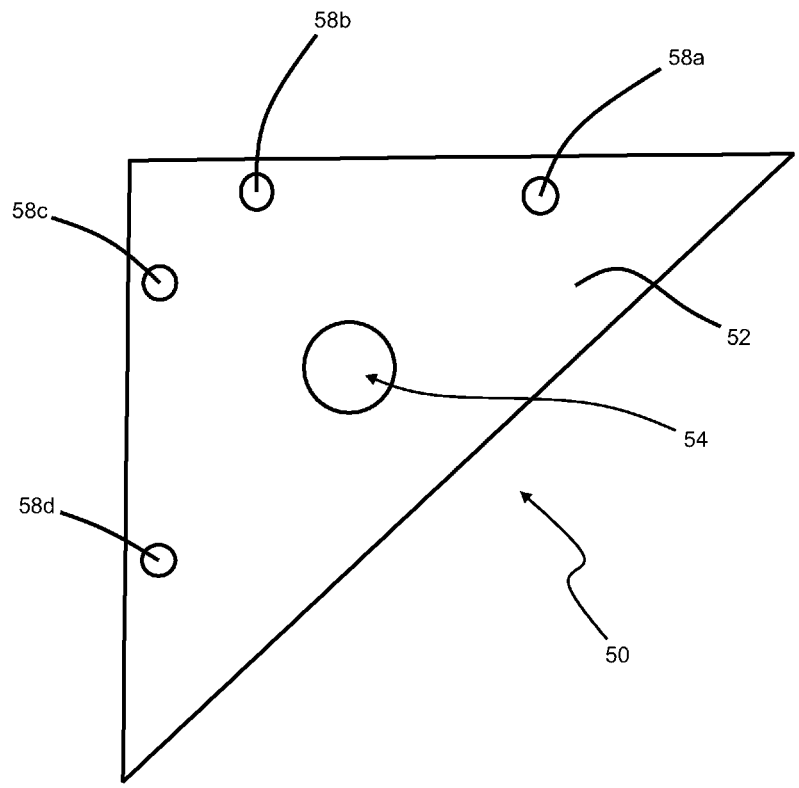
FIG. 27 is a front view of a first embodiment of a second corner bracket.
Figure 30:
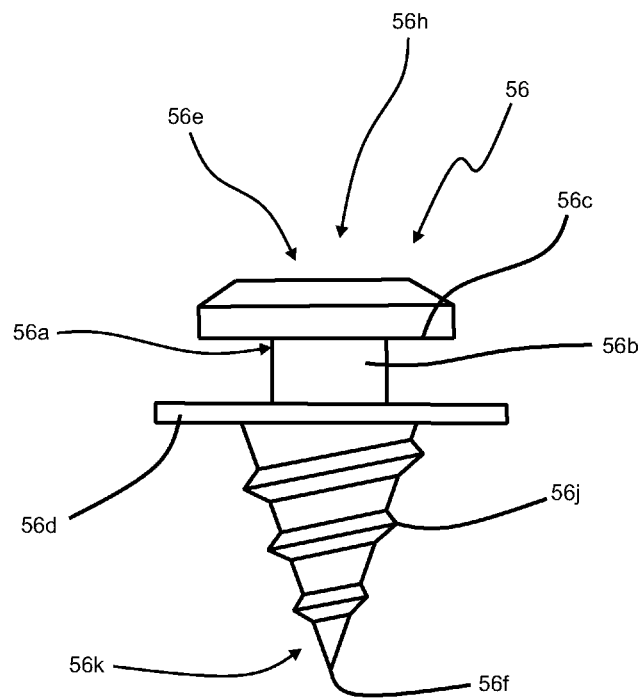
FIG. 30 is a front view of a fifth screw.
Figure 31:
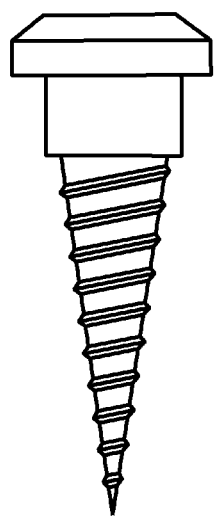
FIG. 31 is a side view of another screw similar to the screws shown in FIG. 29.
Figure 36:
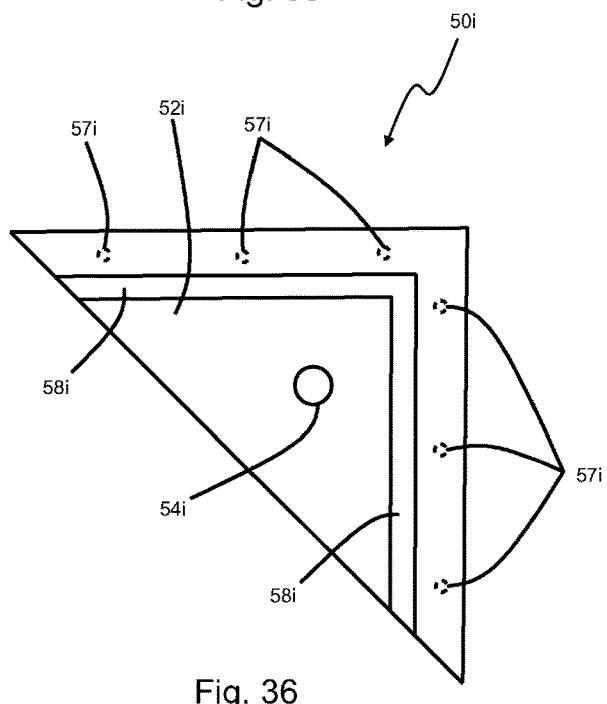
FIG. 36 is a front plan view of a second embodiment of the second corner bracket.
Figure 37:
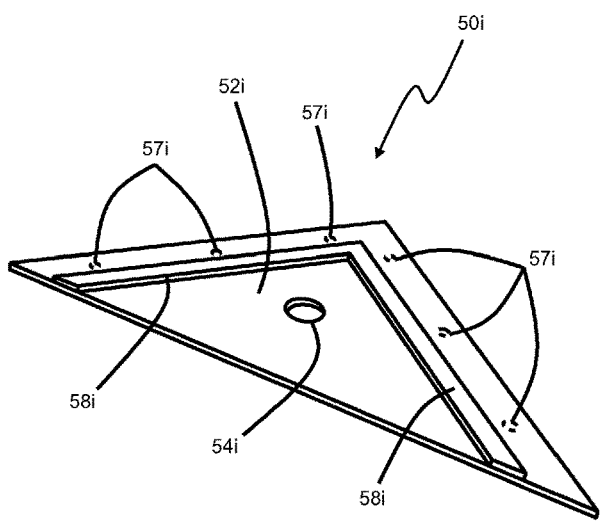
FIG. 37 is a front perspective view of the second embodiment of the second corner bracket.

The following passages describe first and second embodiments of the second corner bracket 50,50*i* and components used with the second corner bracket 50,50*i*. The first embodiment of the corner bracket 50 is shown in FIGS. 27 and 30. The second embodiment of the corner bracket 50*i* is shown in FIGS. 30 and 36-37. In this specification, descriptions of the first corner bracket 40 also describes the first embodiment of the second corner bracket 50 except that the fourth screw 44 may not be mountable to the second corner bracket 50 and the second corner bracket 50 includes the second corner bracket hole or slot 54. In this specification, descriptions of the first flat plate 42 also describe the first and second embodiments of the second flat plate 52,52*i* except that the fourth screw 44 may not be mountable to the second flat plate 52,52*i* and the second corner bracket 50,50*i* includes the second corner bracket hole or slot 54,54*i*.

The first embodiment of the second flat plate 52 includes frame holes 58*a*-*d* which are adapted to be positioned on at least two adjacent sides of the frame 11 when the second flat plate 52 is mounted to the frame 11. The frame holes 58*a*-*d* are adapted to receive the frame hole fasteners. The second embodiment of the second corner bracket 50*i* includes puncture locations 57*i* which are adapted to receive a nail or screw for attachment the second flat plate 52*i* to the frame 11. The puncture locations 57*i* may include small holes or breakable portions. The puncture locations 57*i* may include markings for indicating where to insert the nails or screws. The second embodiment of the second corner bracket 50*i* further includes raised features or protrusions 58*i*. The raised features 58*i* are adapted to contact and abut inner corners of the frame 11 for positioning of the second corner bracket 50*i* relative to the frame 11 when attaching the second corner bracket 50*i* to the frame 11. The raised features 58*i* are in the form of two elongate rectangular prisms with longitudinal axis perpendicular to each other.

Figure 29:
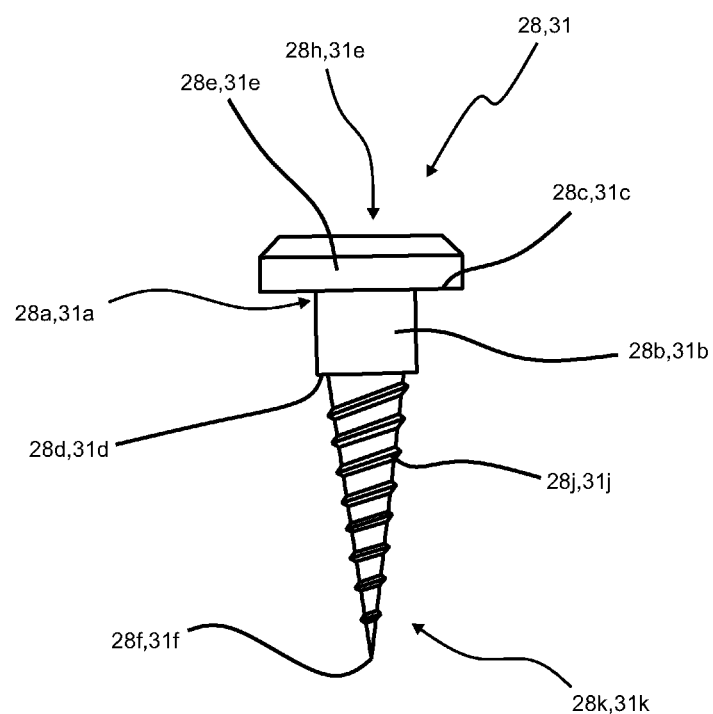
FIG. 29 is a front view of second and third screws.

The fifth screw 56 is shown in FIG. 30. Another variant of the fifth screw is adapted for screwing into wood such as a wooden stud and is described by the above descriptions of the first and third screws 28, 31 and is shown in FIG. 29. The fifth screw 56 includes a radial flange 56*d*. The radial flange 56*d* is separate to and spaced from a head 56*e* on a first end 56*h* of the fifth screw 56 along the shaft 56*b* of the fifth screw 56. The shaft 56*b* extends further past the radial flange 56*d* of the third screw 56. The radial flange 56*d* acts as a barrier such that the fifth screw 56 cannot be screwed into the wall further than the radial flange.

The head 56*e* of the fifth screw includes the radially extending feature 56*c* of the fifth screw 56. The shaft 56*b* of the fifth screw 56 includes a very coarse thread 56*j* which is tapered from the radial flange 56*d* down to a tip 56*f* on a second end 56*k* of the fifth screw 56. The tip 56*f* is where the fifth screw 56*f* is first inserted into the wall 2. The head 56*e* of the fifth screw 56 includes a tool feature such as a linear channel adapted to receive a tool for screwing the fifth screw 56 respectively such as a screwdriver.

The second corner bracket hole or slot 54,54*i* is in the form of a hole with a diameter or shape and size large enough to receive the radially extending feature 56c and the portion 56a of the shaft 56b of the fifth screw 56. The second corner bracket hole or slot 54,54i is adapted such that the fifth screw 56 can hook into the second corner bracket hole or slot 54,54i and be retained in the second corner bracket hole or slot 54 with the radially extending feature 56c of the fifth screw 56.

Figure 28:
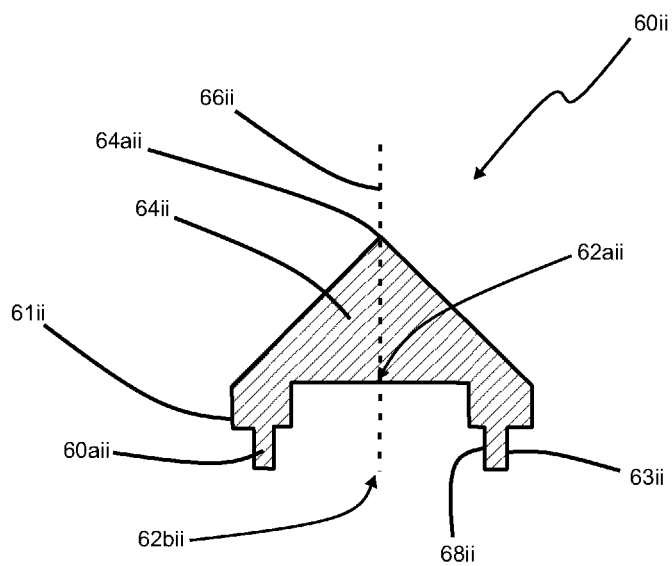
FIG. 28 is a cross-sectional view of a second embodiment of the dent cap.

The wall hanging kit may further include a dent cap 60i,ii. A first embodiment of the dent cap 60i is shown in FIGS. 5-8. A cross section of a second embodiment of the dent cap 60ii is shown in FIG. 28. The dent cap 60i,ii is adapted to make a small dent or mark on the wall 2 for accurate positioning of the first screw 28, the first fastener 38a and/or fifth screw 56 into the wall 2. The dent cap 60i,ii is in the form of a cap and includes a hollow cylinder 60ai,aii with a closed end 62ai,aii and an open end 62bi,bii respectively. The closed end 62ai,aii of the hollow cylinder 60ai,aii includes a dent cap feature 64i,ii protruding in a direction of a longitudinal axis 66i,ii of the dent cap 60i,ii respectively. The longitudinal axis 66i,ii of the dent cap 60i,ii is a longitudinal axis 66i,ii of internal cylindrical surfaces 68i,ii of the hollow cylinder 60ai,aii of the dent cap 60i,ii respectively. The dent cap feature 64i,ii is a cone 64i,ii with a longitudinal axis 66i,ii coaxial with the longitudinal axis 66i,ii of the internal cylindrical surfaces 68i,ii of the dent cap 60i,ii respectively. The cone 64i,ii is pointing outwards, away from the hollow cylinder 60ai,aii respectively. The dent cap feature 64i,ii includes a dent cap point 64ai,aii which is located on the longitudinal axis 66i,ii of the dent cap 60i,ii and is an end most point 64ai,aii of the dent cap 60i,ii respectively. The dent cap point 64ai,aii is located on an opposite end of the dent cap 60i,ii to the open end 62ai,aii of the hollow cylinder 60ai,aii respectively. The dent cap 60i,ii further includes a flange 61i,ii and outer cylindrical surfaces 63i,ii of the hollow cylinder 60ai,aii respectively. The dent cap 60i,ii is adapted to be inserted into the fourth screw hole 44a and/or the second corner bracket hole or slot 54,54i to mark the wall 2. The dent cap 60i,ii is adapted such that the head 29ei,eii, 31e, 44e of the second screw 29i,ii, third screw 31, and/or the fourth screw 44 respectively are removably inserted into the open end 62bi,bii of the dent cap 60i,ii and inside the hollow cylinder 60ai,aii of the dent cap 60i,ii respectively to mark the wall. The internal cylindrical surfaces 68i,ii of the hollow cylinder 60ai,aii include a diameter larger than a diameter of the head 29ei,eii, 31e, 44e of the second screw 29i,ii, third screw 31 and/or fourth screw 44 respectively.

Figure 35:
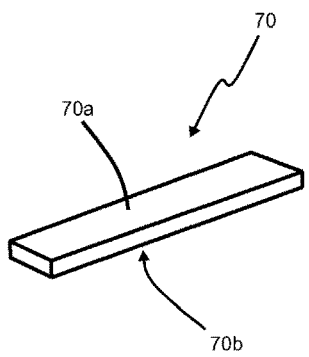
FIG. 35 is a perspective view of a spacer.

The wall hanging kit may further include a spacer 70. The spacer 70 is made of materials including silicone. The spacer 70 includes adhesive on two opposite large flat surfaces 71a,b of the spacer 70. The spacer 70 is adapted to be glued or adhered to and between the object 10 and the wall 2 with the large flat surfaces 71a,b. The spacer 70 includes a width between the two large flat surfaces 70a,b of the spacer 70 which is within 10% of the distance that the screw bracket 20, fastener bracket 30, first corner bracket 40 and/or second corner bracket 50 space a rear surface 13 of the object 10 out from the wall 2. The spacer 70 is adapted to be adhered to a base of the object 10 and the wall 2 between the object 10 and the wall 2. Therefore, the spacer 70 is adapted to orientate a rear face 13 of the object 10 and/or frame 11 vertically or parallel to the wall 2. The spacer 70 is in the shape of a rectangular prism as shown in FIG. 35. Throughout the specification and claims the word "comprise" and its derivatives are intended to have an inclusive rather than exclusive meaning unless the contrary is expressly stated or the context requires otherwise. That is, the word "comprise" and its derivatives will be taken to indicate the inclusion of not only the listed components, steps or features that it directly references, but also other components, steps or features not specifically listed, unless the contrary is expressly stated or the context requires otherwise.

In the present specification, terms such as "apparatus", "means", "device" and "member" may refer to singular or plural items and are terms intended to refer to a set of properties, functions or characteristics performed by one or more items or components having one or more parts. It is envisaged that where an "apparatus", "means", "device" or "member" or similar term is described as being a unitary object, then a functionally equivalent object having multiple components is considered to fall within the scope of the term, and similarly, where an "apparatus", "assembly", "means", "device" or "member" is described as having multiple components, a functionally equivalent but unitary object is also considered to fall within the scope of the term, unless the contrary is expressly stated or the context requires otherwise. In the present specification, the phrase "and/or" refers to severally or any combination of the features. For example, the phrase "feature 1, feature 2 and/or feature 3" includes within its scope any one of the following combinations: Feature 1 or feature 2 or feature 3; feature 1 and feature 2 or feature 3; feature 1 or feature 2 and feature 3; feature 1 and feature 3 or feature 2; feature 1 and feature 2 and feature 3.

The meaning of descriptive, precise or absolute terms such as "flexed", "normal", "parallel", "horizontal", "vertical" or "fully" includes the preceding qualifier "substantially or almost", unless the context or contrary is expressly indicated.

Qualifying relative terms, such as "relatively", "sufficiently", "near", "almost" or "substantially", may be taken to indicate a variation in an absolute value of between 0° and 10° or between 0% and 10%, relative to the absolute value. For example, "near horizontal" may be taken to mean any orientation between 0° and 10° relative to the horizontal.

"Laterally" and "lateral movement" means in a direction having a vector component perpendicular to a longitudinal axis of slot or physical element. A "close fit" means a gap of less than 20% of a diameter or largest width of the element to be fitted.

Orientational terms used in the specification and claims such as vertical, horizontal, top, bottom, upper and lower are to be interpreted as relational and are based on the premise that the component, item, article, apparatus, device or instrument will usually be considered in a particular orientation, which will usually be apparent from the context.

It will be appreciated by those skilled in the art that many modifications and variations may be made to the methods of the invention described herein without departing from the spirit and scope of the invention.

The invention claimed is:

1. A display support kit adapted to support a display object 10 on a structure 2, the display support kit including:
   a bracket 20 formed from a single plate that is folded at a bend 21 intermediate its length to provide a first panel 24a and an opposed second panel 24b joined at the bend 21 which extends laterally across the single plate, the bend 21 having a radius whereby the first and second panels 24a,b are spaced to receive a radially extending feature 29c of a second fastener 29 therebetween, the first and second panels 24a,b extending substantially parallel and in a same direction, the second fastener 29 attachable to the display object 10, wherein:

the second panel 24b is bifurcated, having a pair of divergent arms that define a second slot 26 having an opening to receive a shaft 29b of the second fastener 29, the opening being wider than a diameter of the shaft 29b of the second fastener 29 whereby the bracket 20 is adapted to trap a the radially extending feature 29c of the second fastener 29 between the panels 24a,b; and the bracket 20 includes a T-shaped first slot 22 extending through the first panel 24a whereby a cross-arm of the T-shaped first slot 22 extends laterally and through the bend 21 and a main bar of the first slot 22 is closed at its remote end 22b.

2. The display support kit as claimed in claim 1, wherein the first and second slots 22,26 are adapted to be positioned such that the first and second slots are a pair of associated apertures that are aligned and adapted to receive, at an angle transverse to a main plane of the second panel 24b, a shaft 28b of a first fastener 28 adapted to partially embed in the structure 2.

3. The display support kit as claimed in claim 1, wherein the bracket is a screw bracket 20 for connecting the object 10 to the building structure 2, the first slot being a first vertical slot 22 formed in a rear side 25a of the screw bracket 20 and the second slot being a second vertical slot 26 formed in a front side 25b of the screw bracket 20.

4. The display support kit as claimed in claim 1 wherein the second vertical slot 26 includes an open top end 26b and a closed bottom end 26a, the first vertical slot 22 including a closed top end 22b and an open bottom end 22a.

5. The display support kit as claimed in claim 1, wherein the first vertical slot 22 is adapted to receive a portion 28a (nominated "a first portion") of the shaft 28b (nominated "a first shaft") of the first fastener 28, the first portion 28b being adjacent a radially extending feature 28c (nominated "a first radially extending feature") of the first fastener 28.

6. The display support kit as claimed in claim 1, wherein the second vertical slot 26 is adapted to receive a portion 29a (nominated "a second portion") of the shaft 29b (nominated "a second shaft") of the second fastener 29, the second portion 29a being adjacent a radially extending feature 29c (nominated "a second radially extending feature") of the second fastener 29.

7. The display support kit as claimed in claim 1, wherein the first fastener 28 is adapted to be attached to the structure 2 and the second fastener 29 is adapted to be attached to the object 10.

8. The display support kit as claimed in claim 7, wherein the bracket is a screw bracket 20, the kit further including a fastener bracket 30 including:
a fastener bracket vertical slot 32 on a front side 34a of the fastener bracket 30, the fastener bracket vertical slot 32 including an open top end 32a and a closed bottom end 32b; and
a first set of at least two registered holes 36a,b adapted to receive a third fastener 38a to extend out a rear side of the fastener bracket 30; and a second set of at least two registered holes 39a,b adapted to receive a fourth fastener 38b to extend out of the rear side of the fastener bracket 30.

9. The display support kit as claimed in claim 8, wherein the fastener bracket 30 is adapted to be mounted to the structure that is in the form of a wall 2, the first and second fasteners 28,29 are adapted to be positioned such that the rear side of the fastener bracket 30 is in contact with the wall 2, the fastener bracket vertical slot 32 is adapted to receive a portion of a shaft 31b of a third fastener 31 that is adjacent a radially extending feature 31c of the third fastener 31, the third fastener 31 being adapted to be attached to the object 10.

10. The display support kit as claimed in claim 1, wherein the display support kit further includes a first corner bracket 40 including a first flat plate 42, the first flat plate 42 mountable to the object 10, a fourth fastener 44 which is mountable to the first flat plate 42, a portion of a shaft 44b of the fourth screw 44 being adjacent a radially extending feature 44c of the fourth screw 44, the fourth screw 44 being adapted to be received by either the second slot 26 or the fastener bracket vertical slot 32.

11. The display support kit as claimed in claim 10, wherein the kit further includes a second corner bracket 50 including a second flat plate 52 which is mountable to the object 10, the second flat plate 52 including a second corner bracket hole 54 which is adapted to receive a portion 56a of a shaft 56b of a fifth fastener 56, the portion 56a being adjacent a radially extending feature 56c of the fifth screw 56, the fifth screw 56 adapted to be attached to the wall 2.

12. The display support kit as claimed in claim 11, wherein the first flat plate 42 of the first corner bracket 40 and the second flat plate 52 of the second corner bracket 50 are both each substantially in the shape of a triangle.

13. The display support kit as claimed in claim 11, wherein the U-shaped plate of the screw bracket 20 has a bend between 160°-200°.

14. The display support kit as claimed in claim 13, wherein the first panel 24a is bifurcated, having a pair of divergent arms that define the second slot 26 having an opening to receive the shaft 28b of the first fastener 28, the opening wider than a diameter of the shaft 28b whereby the screw bracket 20 is adapted to trap the radially extending feature in the form of head 28c between the first and second panels 24a,b.

15. The display support kit as claimed in claim 1, wherein the screw bracket 20 is in the form of a U-shaped plate and the first slot is in the form of a vertical slot 22 located on a rear side 24a of the screw bracket 20 and the second slot 26 is in the form of a second vertical slot 26 located on a front side of the screw bracket 20.

16. The display support kit as claimed in claim 1, wherein the maximum width or diameter of the radially extending features 28c,29c of the first and second fasteners 28,29 are larger than a width of the first and second slots 22,26 of the screw bracket 20 such that the first and second fasteners 28,29 are not able to be inserted into or taken out of the first slot 22 and/or the second slot 26, respectively, in a direction perpendicular to the longitudinal axes 22c,26c of the first and/or second slots 22,26, respectively.

17. The display support kit as claimed in claim 1, wherein the first and second slots 22,26 are cut outs through an entire thickness of the single plate of the screw bracket 20.

18. The display support kit as claimed in claim 1, wherein the fastener bracket 30 is in the form of a bent plate and includes a front vertical plate 33a on a front side of the fastener bracket 30, the front side being opposite a rear side of the fastener bracket 30 which includes a rear vertical plate 33b which is adapted to contact the structure 2, the front vertical plate 33a including the fastener bracket's 30 first slot 32.

19. The display support kit as claimed in claim 18, wherein the rear vertical plate 33b includes a rear surface which is adapted to contact the structure 2, a first set of at least two registered holes 36a,b extend through a bend 35a between the rear vertical plate 33b and the front vertical plate 33a along a first line 36c, and a second set of at least two registered holes 39*a,b* extend along a second line 39*c* through first and second sides 37*ai,aii* of a triangular prism 37*a* formed at a top 37 of the fastener bracket 30, wherein, the first line 36*c* is orientated between 0-20° from perpendicular to the rear surface, the second line 39*c* is orientated between 50°-70° to the rear surface, the first and second lines 36*c*,39*c* are in a plane which adapted to be vertical and perpendicular to the rear surface and the second line 39*c* is orientated downwards from the front side of the fastener bracket 30 to the rear side of the fastener bracket 30.

20. The display support kit as claimed in claim 1, further including a dent cap 60*i,ii* which is adapted to make a small dent or mark on the support 2 for accurate positioning of the first fastener 28 into the support 2, the dent cap 60*i,ii* adapted such that the head of a screw can be removably inserted into an open end 60*bi,bii* of the dent cap 60*i,ii* and inside a hollow cylinder 60*ai,aii* of the dent cap 60*i,ii*.

21. The display support kit as claimed in claim 1, further including a spacer 70 adapted to be adhered to and between a base of the object 10 and the support 2 such that a rear face of the object 10 and a frame 11 thereof is orientated vertically or parallel to the support 2.

\* \* \* \* \*